(12) United States Patent
Dalton et al.

(10) Patent No.: US 12,401,440 B2
(45) Date of Patent: Aug. 26, 2025

(54) SYSTEM AND METHODS FOR EVALUATING SONG PLAY PERFORMANCE OF BROADCAST MUSIC

(71) Applicant: Daltboard, LLC, Brentwood, TN (US)

(72) Inventors: Rob Dalton, Brentwood, TN (US); John Philip Baird, Nashville, TN (US); Lance Goodman, Nashville, TN (US)

(73) Assignee: Daltboard, LLC, Brentwood, TN (US)

( * ) Notice: Subject to any disclaimer, the term of this patent is extended or adjusted under 35 U.S.C. 154(b) by 327 days.

(21) Appl. No.: 18/216,646

(22) Filed: Jun. 30, 2023

(65) Prior Publication Data

US 2024/0014915 A1 Jan. 11, 2024

Related U.S. Application Data

(60) Provisional application No. 63/358,269, filed on Jul. 5, 2022.

(51) Int. Cl.
*H04H 60/74* (2008.01)
*G06F 3/16* (2006.01)
(Continued)

(52) U.S. Cl.
CPC ............ *H04H 60/74* (2013.01); *G06F 3/165* (2013.01); *G06F 16/2379* (2019.01);
(Continued)

(58) Field of Classification Search
CPC .. H04W 4/029; H04W 4/185; H04B 7/18545; H04H 60/58; H04H 20/88; H04H 60/64; H04H 60/74; H04H 60/54; H04H 60/66; H04H 60/31; H04H 20/53; H04H 60/56; H04H 60/44; H04H 60/40; H04H 60/372; H04H 60/37; H04H 2201/37; H04H 60/65; H04H 20/10; G06F 3/165; G06F 16/2379;
(Continued)

(56) References Cited

U.S. PATENT DOCUMENTS 10,083,232 B1 * 9/2018 Durham ................ G06F 16/639
2011/0028128 A1 * 2/2011 Cazanas ................ H04H 60/74
455/414.1

(Continued)

*Primary Examiner* — Lana N Le
(74) *Attorney, Agent, or Firm* — H. Brock Kolls

(57) ABSTRACT

The present invention relates to a system and methods for evaluating song play performance of broadcast music. The analytics system comprises one or more data processing resources. The data processing resource receives transaction records that are related to songs being played on radio stations. The transaction records comprise a song identifier, play location, play time, and additional metadata. A user can generate a series of dashboards that comprise indicia or graphics that inform song play performance, radio station airplay performance and insights, generate airplay recommendations and display other information. In an exemplary embodiment, airplay recommendations can include informing the user of song play locations, where a possible space on a radio station's playlist or panel exists. Such possible spaces are opportunities where the user can seek to increase the number of song plays for a desired song at a radio station thus improving the song's rank.

20 Claims, 36 Drawing Sheets

(51) Int. Cl.
*G06F 16/23* (2019.01)
*G06F 16/65* (2019.01)
*G06F 16/68* (2019.01)
*H04H 60/54* (2008.01)
*H04H 60/66* (2008.01)

(52) U.S. Cl.
CPC ............ *G06F 16/65* (2019.01); *G06F 16/686* (2019.01); *H04H 60/54* (2013.01); *H04H 60/66* (2013.01)

(58) Field of Classification Search
CPC ...... G06F 16/65; G06F 16/686; G06F 16/433; G06F 16/635; G06F 16/639; G06Q 30/0201; G06Q 30/0282; G06Q 30/0631; H03J 1/0058; H03J 1/045; H03J 1/0016; H03J 1/02; H03J 3/14; H03J 1/048; H03J 1/047; H03J 7/32
See application file for complete search history.

(56) References Cited

U.S. PATENT DOCUMENTS

| | | | | |
|---|---|---|---|---|
| 2014/0336797 A1* | 11/2014 | Emerson, III | ......... | H04H 60/58 |
| 2014/0357184 A1* | 12/2014 | Martin | ................. | H04W 4/185 |
| | | | | 455/3.06 |
| 2022/0067087 A1* | 3/2022 | Reardon | ............... | G06F 16/635 |

* cited by examiner

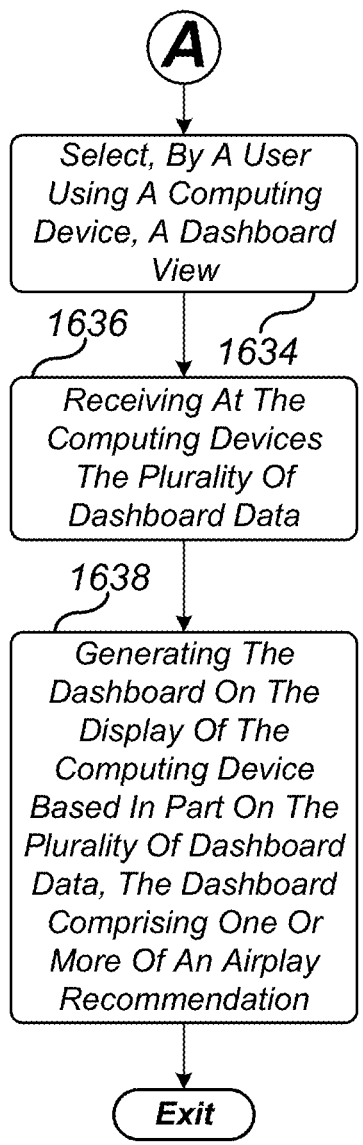
Fig. 33B
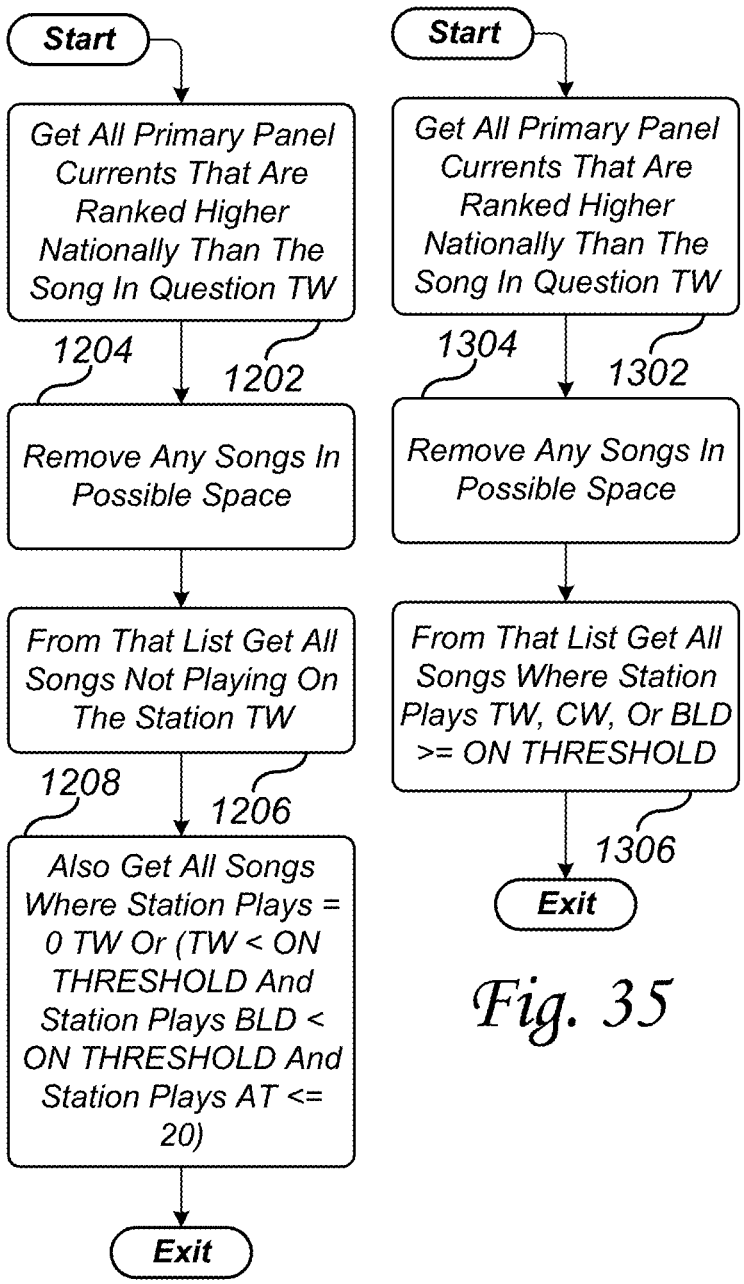
Fig. 34
Fig. 35

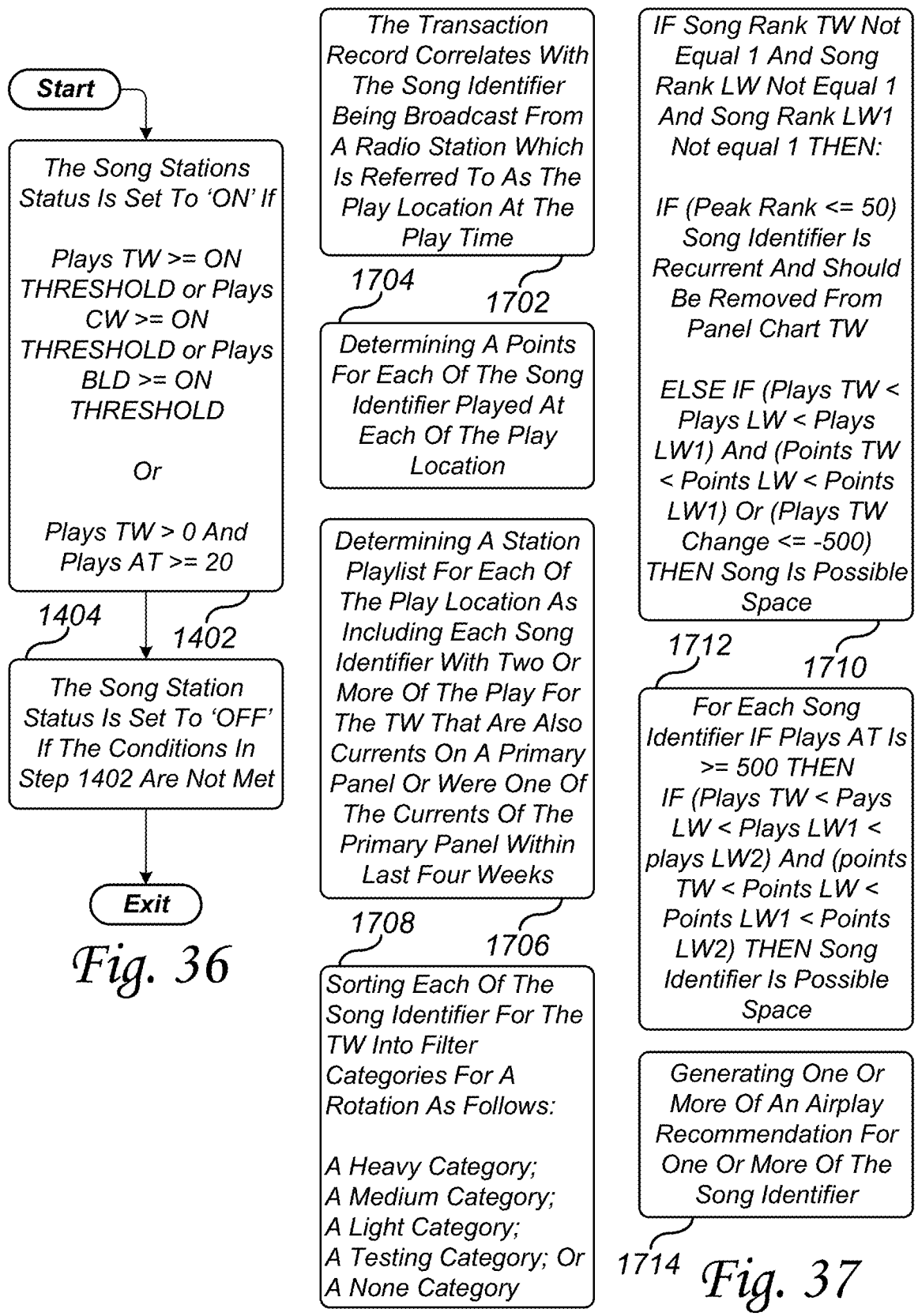

SYSTEM AND METHODS FOR EVALUATING SONG PLAY PERFORMANCE OF BROADCAST MUSIC

CROSS-REFERENCE TO RELATED APPLICATIONS

This application contains subject matter which is related to the subject matter of the following application. The below-listed application is hereby incorporated herein by reference in its entirety:

This is a U.S. non-provisional application claims the benefit of a U.S. provisional application, Ser. No. 63/358,269, inventor Lance Goodman et el., entitled "MUSIC AND DIGITAL MEDIA ANALYTICS PLATFORM", filed Jul. 5, 2022.

TECHNICAL FIELD OF THE INVENTION

This invention relates to a system and methods for evaluating song play performance of broadcast music. The analytics system comprises one or more data processing resources. The data processing resource receives transaction records that are related to songs being played on radio stations. The transaction records comprise a song identifier, a song play location, a song play time, and additional metadata. A user can generate a series of dashboards that comprise indicia or graphics that inform song play performance, radio station airplay performance and insights, generate airplay recommendations, and display other information.

BACKGROUND OF THE INVENTION

Before our invention, it was difficult to sort the airplay data metrics in such a way as to create insights and determine a direction on where to focus promotional and marketing efforts to generate increased airplay of certain songs at terrestrial radio stations and streaming services.

A shortcoming was the inability to sort the airplay data into useful information that could be analyzed to produce specific recommendations of which stations would be most likely to play a song. Additionally, there was also an inability to know which radio stations would benefit from additional airplay of certain songs, and thus difficult for marketers to proactively raise such awareness with a radio station.

Another shortcoming of the prior art is the absence to sort real-time song play and receive notifications to address the shortcomings mentioned and other problem areas that can ultimately affect a song's chart ranking.

The present invention addresses these and other shortcomings by providing a music and digital media analytics system with many advantages over prior systems. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a system for evaluating the play performance of broadcast music. The system comprises one or more servers comprising a microprocessor, a database, and memory. The database and the memory are operationally related to the microprocessor. The memory is encoded with instructions that when executed by the microprocessor perform the step of receiving one or more transaction records from one or more data sources. The transaction record comprises a song identifier, a song play location, and a song play time.

The method continues by storing the transaction record in the database, and sorting each of the song identifiers based on the song play time into timeframes that comprise current week (CW), CW comparison, mean building (BLD), this week (TW), last week (LW), a week before LW (LW1), and the week before LW1 (LW2).

The method then determines each of the following:
 a STATION ON for each of the song identifiers within timeframes of the CW, TW, and LW;
 a STATIONS ON CHANGE for each of the song identifiers within the timeframe of CW and TW;
 a STATIONS ADDED for each of the song identifiers within timeframes of CW and TW;
 a STATIONS DROPPED for each of the song identifiers within the timeframe of TW;
 a STATIONS INCREASED for each of the song identifiers within the timeframe of CW and TW;
 a STATIONS DECREASED for each of the song identifiers within the timeframe of CW and TW; and
 a STATIONS NO CHANGE for each of the song identifiers within the timeframe of CW and TW.

The method continues by determining for each of the song identifiers, based on the song play time, week dayparts which comprise a morning daypart (AM), a midday daypart (MID), an afternoon daypart (PM), an evening day part (EVE), an overnight daypart (OVN), a daytime daypart (DAY), a nighttime daypart (NIGHT), and an all-hours daypart (TOTAL).

Continuing, the method determines a first play date for each of the song identifiers that previously lacked the first play date determination, determines for each song identifier an all-time (AT) historical number of plays, determines for each song identifier a SONG PLAYS (which is the number of song plays) and a POINTS CHANGE (for the song which is a calculated number) for timeframes of the CW, the TW, the LW, the LW1, and the LW2, and determines for each song identifier a song rank for dayparts of the AM, the MID, the PM, the EVE, the OVN, the DAY, the NIGHT, and the TOTAL.

One or more computing devices comprise a device microprocessor, a display, and a device memory. The display and the device memory are operationally related to the device microprocessor, the computing device data communicates by way of a global network with the server. The device memory is encoded with instructions that when executed by the device microprocessor perform the steps of selecting, by a user, a dashboard to view, and causing, based in part on the dashboard selected, the server to access or operate on, to create a plurality of dashboard data related to the dashboard, at least some of the following: one or more of the transaction records, the CW, the CW comparison, the BLD, the TW, the LW, the LW1, the LW2, the STATIONS ON, the STATIONS ON CHANGE, the STATIONS ADDED, the STATIONS DROPPED, the STATIONS INCREASED, the STATIONS DECREASED, the STATIONS NO CHANGE, the first play date, the AM, the MID, the PM, the EVE, the OVN), the DAY), the NIGHT, the TOTAL, or the AT.

The method continues by receiving, at the computing device, from the server the plurality of dashboard data related to the dashboard, and generating the dashboard on the display of the computing device comprising indicia or graphics based in part on the plurality of dashboard data.

Wherein the user can evaluate the play performance of one or more of the song identifiers, the song play location, and the song play time.

Additional shortcomings of the prior art are overcome and additional advantages are provided through the provision of a method of evaluating song play performance of broadcast music. The method comprises the steps of receiving, at one or more servers, one or more transaction records from one or more data sources. The transaction record comprises a song identifier, a song play location, and a song play time.

The method continues by storing, at the server, the transaction record in a database. The server has data communication access to the database. The method then sorts, at the server, each of the song identifiers based on the song play time into timeframes that comprise current week (CW), CW comparison, mean building (BLD), this week (TW), last week (LW), a week before LW (LW1), and a week before LW1 (LW2).

The method continues by determining each of the following:
- a STATIONS ON for each of the song identifiers within the timeframes of CW, TW, and LW;
- a STATIONS ON CHANGE for each of the song identifiers within the timeframe of TW;
- a STATIONS ADDED for each of the song identifiers within the timeframes of CW and TW;
- a STATIONS DROPPED for each of the song identifiers within the timeframe of TW;
- a STATIONS INCREASED for each of the song identifiers within the timeframe of CW and TW;
- a STATIONS DECREASED for each of the song identifiers within the timeframe of CW and TW; and
- a STATIONS NO CHANGE for each of the song identifiers within the timeframe of CW and TW.

The method continues by determining for each of the song identifiers, based on the song play time, week dayparts which comprise a morning daypart (AM), a midday daypart (MID), an afternoon daypart (PM), an evening day part (EVE), an overnight daypart (OVN), a daytime daypart (DAY), a nighttime daypart (NIGHT), and an all-hours daypart (TOTAL).

Continuing, the method determines a first play date for each of the song identifiers that previously lacked the first play date determination, determines for each song identifier an all-time (AT) historical number of plays, determines for each song identifier a SONG PLAYS (which is the number of song plays) and a POINTS CHANGE (for the song which is a calculated number) for timeframes of the CW, the TW, the LW, the LW1, and the LW2, and determines for each song identifier a song rank for dayparts of the AM, the MID, the PM, the EVE, the OVN, the DAY, the NIGHT, and the TOTAL.

The method continues by selecting, by a user using one or more computing devices, a dashboard to view. The computing device data communicate by way of a global network with the server. The method then causes, based in part on the dashboard selected, the server to access or operate on, to create a plurality of dashboard data related to the dashboard, at least some of the following: one or more of the transaction records, the CW, the CW comparison, the BLD, the TW, the LW, the LW1, the LW2, the STATIONS ON, the STATIONS ON CHANGE, the STATIONS ADDED, the STATIONS DROPPED, the STATIONS INCREASED, the STATIONS DECREASED, the STATIONS NO CHANGE, the first play date, the AM, the MID, the PM, the EVE, the OVN, the DAY, the NIGHT, the TOTAL, or the AT.

The method then receives, at the computing device, from the server the plurality of dashboard data related to the dashboard, and generates the dashboard on the display of the computing device comprising indicia or graphics based in part on the plurality of dashboard data. Wherein the user can evaluate the play performance of one or more of the song identifiers, the song play location, and the song play time.

Additional shortcomings of the prior art are overcome and additional advantages are provided through the provision of a method of evaluating song play performance of broadcast music. The method comprises the steps of receiving, at one or more servers, one or more transaction records from one or more data sources. The transaction record comprises a song identifier, a song play location, and a song play time.

The method continues by storing, at the server, the transaction record in the database, and sorting, at the server, each of the song identifiers based on the song play time into timeframes that comprise current week (CW), CW comparison, mean building (BLD), this week (TW), last week (LW), the week before LW (LW1), and the week before LW1 (LW2).

The method continues by determining at least one of the following:
- a STATIONS ON for each of the song identifiers within the timeframes of CW, TW, and LW;
- a STATIONS ON CHANGE for each of the song identifiers within the timeframe of CW and TW;
- a STATIONS ADDED for each of the song identifiers within the timeframes of CW and TW;
- a STATIONS DROPPED for each of the song identifiers within the timeframe of CW and TW;
- a STATIONS INCREASED for each of the song identifiers within the timeframe of CW and TW;
- a STATIONS DECREASED for each of the song identifiers within the timeframe of the CW and TW; or
- a STATIONS NO CHANGE for each of the song identifiers within the timeframe of the CW and TW.

The method continues by determining for each of the song identifiers, based on the song play time, week dayparts which comprise morning daypart (AM), midday daypart (MID), afternoon daypart (PM), evening day part (EVE), overnight daypart (OVN), daytime daypart (DAY), nighttime daypart (NIGHT), and all-hours daypart (TOTAL).

The method continues by determining for each song identifier an all-time (AT) historical number of plays, determining for each song identifier a SONG PLAYS and a POINTS CHANGE for timeframes of the CW, the TW, the LW, the LW1, and the LW2, the points are equal to the song plays multiplied by a weighting factor for the song play location, and determining for each song identifier a song rank for dayparts of the AM, the MID, the PM, the EVE, the OVN, the DAY, the NIGHT, and the TOTAL.

The method continues by determining if the song identifier is a POSSIBLE SPACE by one of the following steps:
  if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the POSSIBLE SPACE, wherein the POSSIBLE SPACE are songs recently or soon to be removed from the chart; or
  if the song rank for the TW< >1 and the song rank for the LW< >1 and the song rank from the LW1< >1 then if (a peak rank<=50) then the song identifier is recurrent and should be removed from the panel chart for the TW else if (the song plays for the TW<the song plays for the LW<the song plays for the LW1) and (the points for the TW<the points for the LW<the points for the LW1) or (the song plays for the TW change<=−500) then the song identifier is the POSSIBLE SPACE.

May also be determined by taking the currents that have at least one week of negative growth on the national panel. Songs that are positive in CW+/− plays or points are not included.

The term negative growth refers to songs with a decrease in points, and a decrease in plays from LW to TW. So if both plays and points (+/−) are negative, the song would be included in possible space. Unless the CW+/− for plays or points is positive. Possible space songs must also be ranked 80 or higher (80, 79, 78 . . . ) on the national panel.

The method continues by selecting, by a user using one or more computing devices, a dashboard to view, the computing device data communicates by way of a global network with the server. The method then receives, at the computing device, from the server a plurality of dashboard data related to the dashboard.

The method continues by generating the dashboard on the display of the computing device comprising indicia or graphics based in part on the plurality of dashboard data. The dashboard comprises one or more airplay recommendations for one or more of the song identifiers. Wherein the airplay recommendation includes informing the user of one or more of the song play locations where a POSSIBLE SPACE exists where the user can seek to increase the number of the song plays for desired one or more of the song identifiers thus improving the SONG RANK for desired one or more of the song identifiers.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which:

FIGS. 3-5 illustrates one example of a Selected Song user interface with a plurality of dashboards;

FIG. 6 illustrates one example of a Selected Song user interface with a Station Airplay dashboard;

FIG. 7 illustrates one example of a Selected Song user interface with an Ownership dashboard;

FIG. 11 illustrates one example of a Competition user interface;

FIG. 12 illustrates one example of a Chart user interface with a Current chart dashboard;

FIG. 17 illustrates one example of a Stations user interface with a Playlist dashboard;

FIG. 18 illustrates one example of a Stations user interface with a Music Stack dashboard;

FIGS. 33A-33B illustrates one example of a method of evaluating song play performance of broadcast music;

FIG. 34 illustrates one example of songs ranked higher (High) calculation method;

FIG. 35 illustrates one example of songs ranked lower (Low) calculation method;

FIG. 36 illustrates one example of a song station status calculation method;

FIG. 37 illustrates exemplary embodiments of a global network based system for evaluating song play performance of broadcast music that can be used interchangeably with the methods of the present invention.

Figure 1A:
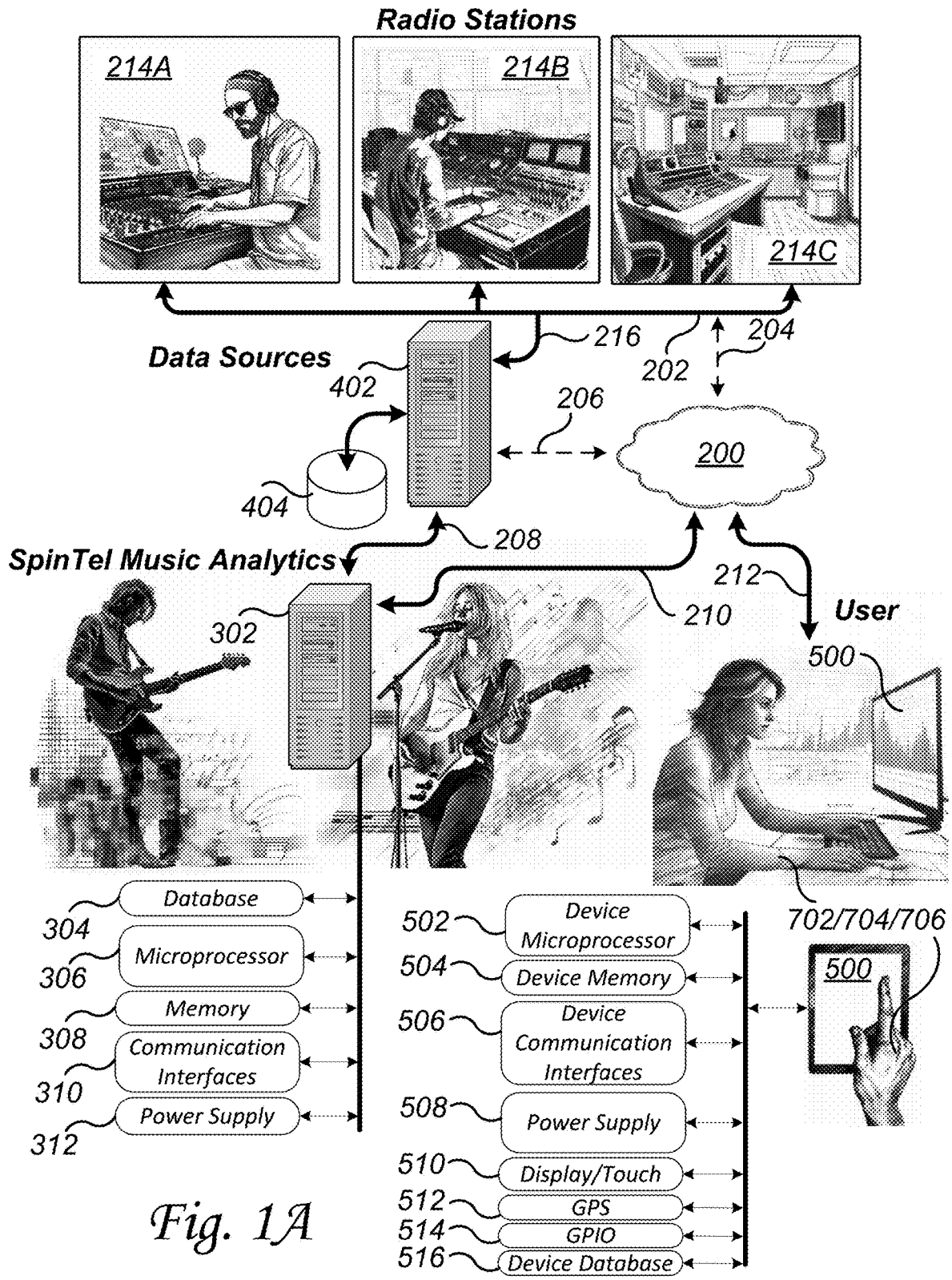
FIG. 1A illustrates one example of a global network based system for evaluating song play performance of broadcast music.

The detailed description explains the preferred embodiments of the invention, together with advantages and features, by way of example with reference to the drawings.

DETAILED DESCRIPTION OF THE INVENTION

In the present invention, a song is associated with and can be referred to as a "song identifier". With regard to data processing, the song identifier uniquely identifies the song.

In the present invention, the term "STATION" is intended to mean a radio station that plays songs. The term "PANEL" is intended to mean a group of radio stations. The term "primary panel (national)" is intended to mean the main group of radio stations that the national ranking chart is based on. The term "CURRENTS" is intended to mean songs that have a status of current on the selected panel. The method of calculating "CURRENTS" is detailed in the calculations section below.

In the present invention, the term "RECURRENTS" is intended to mean songs that are playing on a station or panel that do not have a status of current. The method of calculating "RECURRENTS" is detailed in the calculations section below. The term "panel chart" is intended to mean a ranking of songs with a status of current for this week ("TW") timeframe. The method of calculating the "panel chart" is detailed in the calculations section below. The term "ON THRESHOLD" is intended to mean the number of song plays that move a song from a status of NOT ON to ON.

In the present invention, the term "timeframe" is intended to mean the time period that is being examined or otherwise looked at for a particular metric.

In the present invention, AT is intended to mean all-time (AT). In this regard, all-time is a reference to data elements or rankings based on a historical dataset.

In the present invention, CW is intended to mean the current week (CW). In this regard, a reference to the current calendar week which is the most recent Sunday through the current day/time. As an example, if the current day/time is Thursday, September $16^{th}$ 15:00:00, CW=Sunday, September $12^{th}$ 00:00:00 Through Thursday, September $16^{th}$ 15:00:00.

In the present invention, CW comparison is intended to mean the previous Sunday through the current day/time for that week. As an example, if the current day/time is Thursday, September $16^{th}$ 15:00:00 then CW comparison=Sunday, September $5^{th}$ 00:00:00 through Thursday, September $9^{th}$ 15:00:00.

In the present invention, BLD is intended to mean building (BLD). In this regard, the previous 7 days ending yesterday. As an example, if the current day is Thursday, September $16^{th}$ then BLD=Thursday, September $9^{th}$ 00:00:00 Through Wednesday, September $15^{th}$ 23:59:59.

In the present invention, TW is intended to mean this week (TW), where the national chart rankings are based on this. As an example, the previous Sunday Through Saturday, if the current day is Thursday, September $16^{th}$ then TW=Sunday, September $5^{th}$ 00:00:00 Through Saturday, September $11^{th}$ 23:59:59.

In the present invention, LW is intended to mean last week (LW) as in the week before TW. As an example, if the current day is Thursday, September $16^{th}$, then LW=Sunday, August $29^{th}$ 00:00:00 Through Saturday, September $4^{th}$ 23:59:59. Correspondingly, LW1 is the week before LW, LW2 is the week before LW1, and LW3 is the week before LW2.

In the present invention, dayparts are intended to mean various time periods throughout the day. In this regard, AM is the morning from 06:00:00 through 09:59:59, MID is midday from 10:00:00 through 14:59:59, PM is the afternoon from 15:00:00 through 18:59:59, EVE is the evening from 19:00:00 through 23:59:59, and OVN is overnight from 00:00:00 through 05:59:59. Continuing, DAY is daytime from 06:00:00 through 18:59:59, NIGHT is nighttime from 19:00:00 through 05:59:59, and TOTAL is all-hours if no daypart is specified, then it is assumed to be TOTAL.

In the present invention, song metrics include PLAYS which is a count of how many times a song has been played by a panel, on a radio station, or by an ownership group. The COUNT of a song PLAYS can be grouped by either station or panel as well as timeframe and daypart. As an example, the station WSIX plays TW count of all plays of a song on the station WSIX this week (TW), and primary (National) DAY plays CW which is the count of all plays of a song on stations within the primary panel for the current week (CW) played during the day (DAY). Furthermore, the panel (Northwest) plays AT count of all plays of a song on stations within the Northwest panel.

In the present invention, PLAYS CHANGE (+/−) can be sorted by panel, station, ownership group, or other filter categories. The PLAYS CHANGE (+/−) is the difference in plays between a timeframe and the previous timeframe and grouped by either station or panel and also daypart. As an example, the station WSIX PLAYS CHANGE TW is the difference between plays TW and plays LW for a song on WSIX. Primary (National) PLAYS CHANGE CW is the difference between plays CW and plays CW comparison for a song playing on stations in the primary panel.

In the present invention, POINTS can be sorted by panel, station, ownership, or other filter categories. POINTS are an assigned weighting factor for each station also referred to as the song play location. To get SONG POINTS you take the number of station plays and multiply it by the station weight. PANEL POINTS are the sum of POINTS for all stations on that panel. As an example, station WSIX has a weight of 7, and the song in question had 3 plays TW on that station, therefore, the song station WSIX POINTS TW=21.

In an exemplary embodiment, POINTS CHANGE refers to the POINTS change between two timeframe points, or other points.

In the present invention, RANK, CURRENTS can be sorted by panel, ownership, or other filter categories. The RANK of a song is the total plays on a panel for a timeframe and daypart, where the song with the highest number of plays is ranked one and includes only songs that are CURRENTS on the selected panel for the selected timeframe, see the calculations for CURRENTS.

In the present invention, RANK in a playlist can be sorted by the station or multiple other factors. In an exemplary embodiment, in this regard, the RANK of a song can be associated with the total plays on a station for a timeframe, daypart, or other factors and/or segmentation, where the song with the highest number of plays is ranked one and includes only songs that are on the station PLAYLIST for the selected timeframe, see the calculations for the PLAYLIST.

In the present invention, RANK OVERALL can be sorted by panel, station, ownership, or multiple other factors. In an exemplary embodiment, in this regard, the RANK of a song can be by total plays associated with either a panel or station for a timeframe, daypart, or other factors and/or segmentation where the song with the highest number of plays is ranked one and includes all songs on that panel or station for the selected timeframe. If two songs have the same number of plays other ranking factors can be used to sort the songs and create the RANKED PLAYLIST.

In the present invention, PEAK RANK can be sorted by panel, station, ownership, or other filter categories. The PEAK RANK is the highest rank a song achieved in a week using TW timeframe for either panel or station.

In the present invention, ADDED RANK by the panel can be sorted by station or other filter categories. The ADDED RANK of a song on the primary panel when the song first had a ranking less than 100, or other calculation factors.

In the present invention, the ADDED RANK of the station can be sorted by the station. The ADDED RANK of the station is when the song first had a status of ON for the station.

In the present invention, ADDED WEEK of the station. Is when a song first had a status of ON for the station.

In the present invention, the FIRST PLAY WEEK can be sorted by panel, station, ownership, and other filter categories. In this regard, the FIRST PLAY WEEK is when a song play was recorded.

In the present invention, the PRIMARY NATIONAL RANK DIFFERENCE can be sorted by station, ownership, and other filter categories. In this regard, the PRIMARY NATIONAL RANK DIFFERENCE is the difference between a song's rank on the primary panel TW and the song's rank on an individual station TW.

In the present invention, HEADROOM can be sorted by station, ownership, or other filter categories. In this regard, HEADROOM is the difference in plays between the song with the most plays on the station that week that is also a current and the plays of the song in question on that station.

In the present invention, STATUS can be sorted by station, ownership, or other filter categories. In this regard, STATUS is either ON or NOT ON, see the calculations for song station status.

In the present invention, AVERAGE STATION PLAYS can be sorted by the panel, ownership, and other filter categories. In this regard, the AVERAGE STATION PLAYS is the sum of all plays on stations within a panel where the song status is ON divided by the total number of stations on that panel where the song has a status of ON, see the calculations for song station status.

In the present invention, AVERAGE PLAY COMPARISON can be sorted by station. In this regard, AVERAGE PLAY COMPARISON is the difference between SONG PLAYS (TW) on an individual station and AVERAGE STATION PLAYS for the selected panel.

In the present invention, RANK PLAY COMPARISON can be sorted by station. In this regard, RANK PLAY COMPARISON is the difference between a song's STATION PLAYS (TW) and the STATION PLAYS (TW) of the song on that station with the same station rank TW as the initial song's national rank TW.

In the present invention, RANK PLAY COMPARISON can be sorted by negative, positive, total, panel, and other filter categories. In this regard, negative is the sum of rank play comparisons where the result is negative for stations in the panel. Positive is the sum of rank play comparisons where the result is positive for stations in the panel. Total is the sum of all rank play comparisons for stations in the panel.

In the present invention, STATIONS ON can be sorted by panel, ownership, or other filter categories. In this regard, STATIONS ON are the total number of stations where the song has a status of ON indicating the song is being played on the radio station.

In the present invention, STATIONS NOT ON can be sorted by the panel, ownership, and other filter categories. In general, STATIONS NOT ON is the total number of stations where the song has a status of NOT ON indicating the song is not being played on the radio station.

In the present invention, ADDS (CW, TW) can be sorted by panel, ownership, or other filter categories. The ADDS (CW, TW) are the total number of station adds during the timeframe, see the calculations for station adds.

In the present invention, DROPS can be sorted by panel, ownership, or other filter categories. The DROPS are the total number of station drops, see the calculations for station drops.

In the present invention, PLAY INCREASES (CW, TW) can be sorted by panel, ownership, or other filter categories. In general, PLAY INCREASES is the total number of stations where play change is positive during the timeframe.

In the present invention, PLAY DECREASES (CW, TW) can be sorted by panel, ownership, or other filter categories. In general, PLAY DECREASES is the total number of stations where play change is negative during the timeframe.

In the present invention, NO CHANGE (CW, TW) can be sorted by panel, ownership, or other filter categories. In general, NO CHANGE is the total number of stations where play change has not changed during the timeframe.

In the present invention, the HIGH COUNT can be sorted by station or other filter categories. The HIGH COUNT is the count of songs ranked higher, see the calculations for songs ranked higher.

In the present invention, the LOW COUNT can be sorted by station or other filter categories. The LOW COUNT is the count of songs ranked lower, see the calculations for songs ranked lower.

In the present invention, ON THRESHOLD is the number of plays that moves a song from a radio station play status of NOT ON to ON indicating the song is being played on the radio station.

In the present invention, ROTATION can be calculated by plays or rank. Individual teams can determine rotation designations. In an exemplary embodiment, the ROTATION can be one of six filter categories below depending on the number of plays TW:
  HEAVY: Plays TW>=40;
  MEDIUM: Plays TW>=25;
  LIGHT: Plays TW>=10;
  DAYPART: Plays TW>=ON THRESHOLD;
  TESTING: Plays TW>0 and <ON THRESHOLD; or
  NONE: Plays TW=0.

In the present invention, OUTLOOK can be sorted by station, or other filter categories. In an exemplary embodiment, the OUTLOOK can be one of six default values, or user-defined values if set. In an exemplary embodiment, teams and other users can set and change parameters, and values as well as create and remove them as may be required and/or desired in a particular embodiment. In an exemplary embodiment, for example, and not a limitation, the default values can include None, Added, Probable, Possible, Reach, Prove It, or Custom User Defined.

In the present invention, station metrics can include TESTING. TESTING is a current song that is playing on the station one or two times per week. In an exemplary embodiment, teams and other users can set and change parameters and values as may be required and/or desired in a particular embodiment. In one embodiment, for example, and not a limitation, DAYPARTS (Not to be confused with dayparts referring to AM, MID, PM, EVE, OVN) is a current song that is playing on the station between two and nine times in a week.

In the present invention, CURRENTS is a current song that is playing on the station ten or more times in a week.

In the present invention, PLAYLIST SIZE is the total number of dayparts and CURRENTS. MAX PLAYS is the total number of plays TW for the current song on the station with the most plays.

In the present invention, POSSIBLE SPACE is the number of songs from the primary panel possible space list that are playing on the station TW. In this regard, songs also referred to as song identifiers that are in the POSSIBLE SPACE list are songs recently, or soon to be removed from a chart. Identifying these POSSIBLE SPACE songs creates an opportunity for a user of the system to promote their desired songs to radio stations also referred to as song play locations in hopes of supplanting an outgoing song to increase plays of their desired song in hopes of improving the song ranking of their desired song.

In the present invention, the AVERAGE ADD RANK is the average primary panel rank when a song is added to a station (Based on historical data).

In the present invention, PERCENT ADDED ABOVE is the percentage of CURRENTS that were added to a station above a song's current primary panel rank.

In the present invention, MUSIC STACK is the songs that are CURRENTS on the primary panel, not in possible space, and not playing on the station TW, they have also had less than 100 plays on the station AT. If a song was ON a radio station playlist previously playing>=ON THRESHOLD and now is less than that it can be designated with a color code.

In the present invention, OWNERSHIP METRICS can include AVERAGE PLAYLIST SIZE (TW) which is the average playlist size of stations within an ownership group.

In the present invention, PERCENT PANEL PLAYS (TW) is the percent of current plays of all songs on stations within an ownership group.

In the present invention, PERCENT SONG PLAYS (TW) is the percentage of individual song plays on ownership group stations compared to all song plays on all primary panel stations.

In the present invention, PLAY OFFSET (TW) is the difference between my songs PANEL PLAYS and other songs PANEL PLAYS.

In the present invention, AVERAGE STATION PLAY OFFSET (TW) is the difference between the average number of station plays for all stations on the primary panel and the average station plays for the ownership group.

In the present invention, AVERAGE ADD RANK is the average add rank of a song amongst the stations in an ownership group.

In the present invention, panel CURRENTS calculations that show how the results are achieved involve songs that are CURRENTS and are calculated in different ways depending on the data source, and format. CURRENTS will always be calculated based on a week and panel. The primary (national) panel is used to determine CURRENTS for Country format.

Reference is made to the Figures as an illustration of one example of the present invention. As a second example of the present invention, appendixes that are part of the incorporated by reference provisional application 63/358,269 includes a set of user interface screen illustrations that detail the various features, graphical displays, data views, dashboards, menu navigation/options, user/customer/client profile management tools, and other features and aspects that can be tailored as may be required and/or desired in a particular embodiment.

Figure 2:
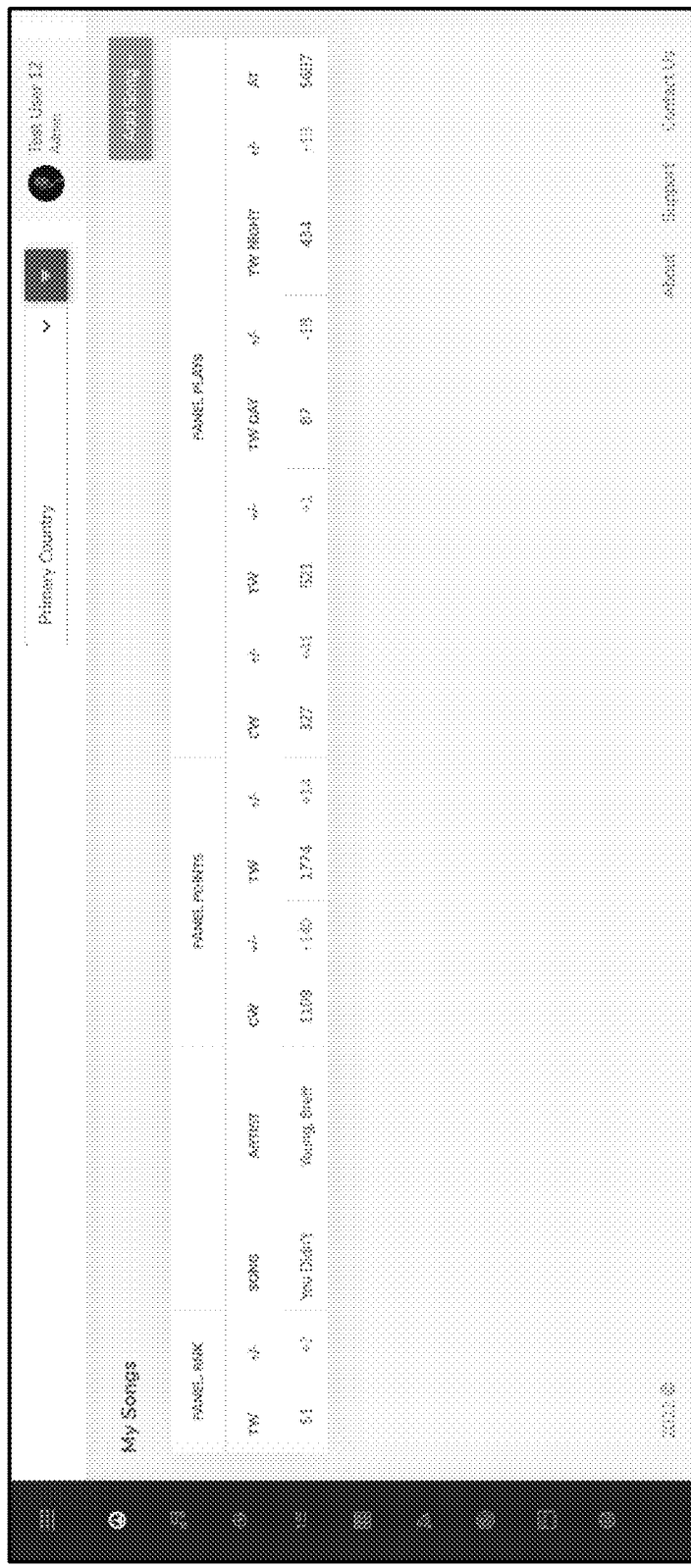
FIG. 2 illustrates one example of a My Songs user interface.
Figure 3:
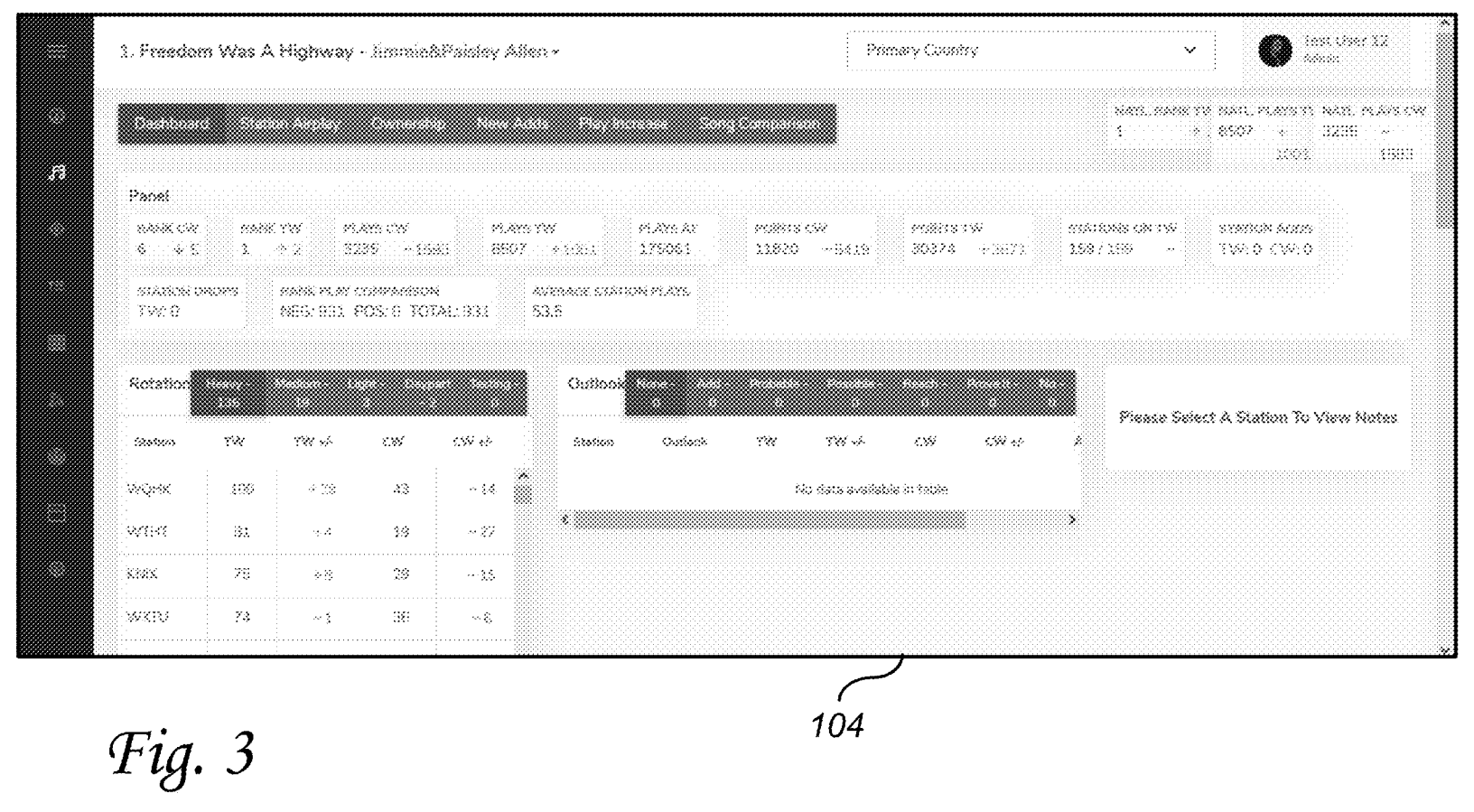
Figure 4:
Figure 5:
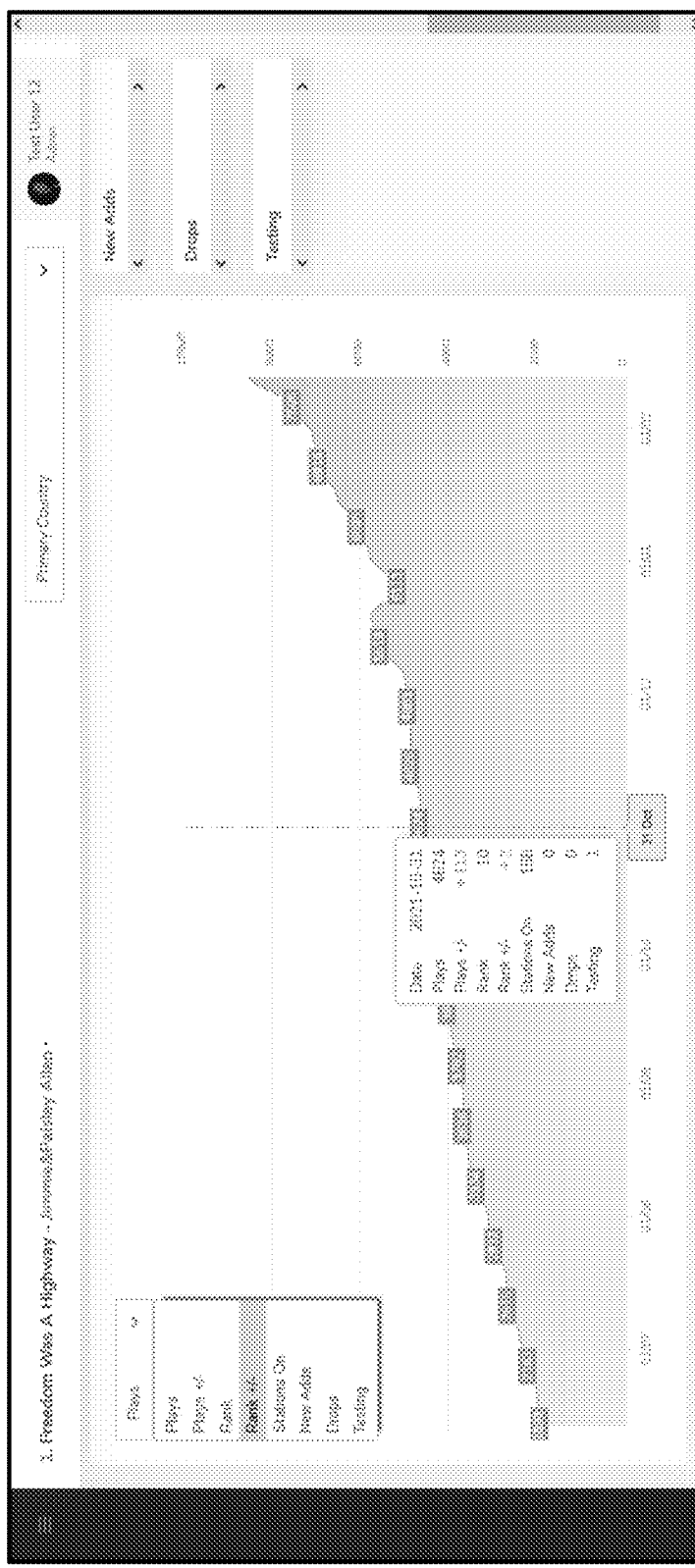

Turning now to FIG. 1A, the music and digital media and analytic system of the present invention can be accessed over a global network 200 such as the Internet and used through a series of dashboard pages. In this regard, referring to FIG. 2 there is illustrated one example of a My Songs user interface 102, and referring to FIGS. 3-5 there is illustrated one example of a Selected Song user interface 104 with a plurality of dashboards including 106 and 108.

With reference to FIG. 1A, in an exemplary embodiment, users of the system, network, and methods can include artists 702, manager 704, or other authorized people 706.

Each of the users 702/704/706 use computing devices 500 to data communicate 212 over a global communication network 200 with one or more data processing resources 302. The computing devices 500 can be laptop computers, desktop computers, smartphones, tablets, or other types and kinds of computing devices, as may be required and/or desired in a particular embodiment. The global communication network 200 can be the Internet.

The computing devices 500 can comprise a device microprocessor 502, a device database 516, a device memory 504, a device communication interface 506, a display/touch screen 510, and a plurality of general-purpose inputs and outputs (GPIO) 514. Additionally, the mobile type of computing device 500 (tablets, smartphones, and others) can comprise a global positioning system (GPS) 512. In general, computing devices 500 can be configured with other functions and features, as may be required and/or desired in a particular embodiment.

In an exemplary embodiment, the device microprocessor 502 is operationally related to device database 516, device memory 504, device communication interface 506, display 510, GPIO 514, and GPS 512. The computing devices 500 each rely on a suitable power supply 508 which can include a rechargeable battery, external power supply, or other types and/or kinds of power sources. The power supply 508 provides power for the operation of the computing device 500.

The device microprocessor 502 can be INTEL, ZILOG, MICROCHIP, AMD, ARM, and/or other types or kinds of microprocessors.

The device database 516 can be SQL, MYSQL, MARIADB, ORACLE, MS ACCESS, network-accessible storage, flat files, a combination thereof, or other types and kinds of databases.

The device memory 504 can be a combination of RAM, ROM, flash, hard drives, solid-state drives, USB flash drives, micro-SD cards, or other types of removable memory, and/or other types and kinds of memory.

The device communication interfaces 506 can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display/touch screen 510 can be a liquid crystal display (LCD), light emitting diode (LED), organic light emitting diode (OLED), or other types and kinds of displays.

The general-purpose inputs and outputs (GPIO) 514 can be TTL, CMOS, MOSFET, transistors, buffers, relays, pushbuttons, switches, and/or other types and kinds of GPIO circuits. In an exemplary embodiment, some of the GPIO 514 lines can be used to drive a touch screen input, biometric input devices, keyboards, and or types and kinds of computing device input devices.

Global positioning system (GPS) device 512 can be used to determine the geographic location of the computing device 500 equipped with a GPS 512. In this regard, such computing devices 500 are typically mobile computing devices.

With reference to FIG. 1A, the data processing resource 302 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 302 can also be referred to as server 302.

The data processing resource 302 can comprise a microprocessor 306, a database 304, memory 308, a communication interface 310, and a power supply 312. The microprocessor 306 is operationally related to database 304, memory 308, and communication interface 310. Power supply 312 provides power for the operation of the data processing resource 302.

The microprocessor 306 can be INTEL, ZILOG, MICROCHIP, AMD, ARM, and/or other types or kinds of microprocessors.

Database 304 can be SQL, MYSQL, MARIADB, ORACLE, MS ACCESS, network-accessible storage, flat files, a combination thereof, or other types and kinds of databases.

The memory 308 can be a combination of RAM, ROM, flash, hard drives, solid-state drives, USB flash drives, micro-SD cards, or other types of removable memory, and/or other types and kinds of memory.

The communication interfaces 310 can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, one or more data sources 402 can aggregate data related to songs identified by song identifiers, where the songs are being played, as in, which radio stations 214, over the air or online broadcast centers 214B, and other places 214C, and the time in which they are being played, as well as other data as may be required and/or desired in a particular embodiment. Such song play data can be stored in database 404.

In operation, data sources 402 can receive the data 202 from song play sources 214A-C in a direct manner 216 such as VPN, data storage media, or other direct methods, or over 204/206 the global network 200. In some embodiments, devices can be set up at the song play location to data communicate with the data sources 402. In other embodiment, devices can listen to a broadcast and decern what is being played and data communicate such information to the data sources 402. In other embodiments, the song play location can upload or otherwise data communicate playlists and other information as may be required and/or desired in a particular embodiment. In other embodiments, song play sources 214A-C can data communicate song play information, song play location, song play time, and other data in other ways, as may be required and/or desired in a particular embodiment.

In an exemplary embodiment, data sources 402 can data communicate transaction records 602 and other data with data processing resources 302. Such data communication can be direct 208 such as VPN or data storage media, or over 210 a global network 200.

Figure 1B:
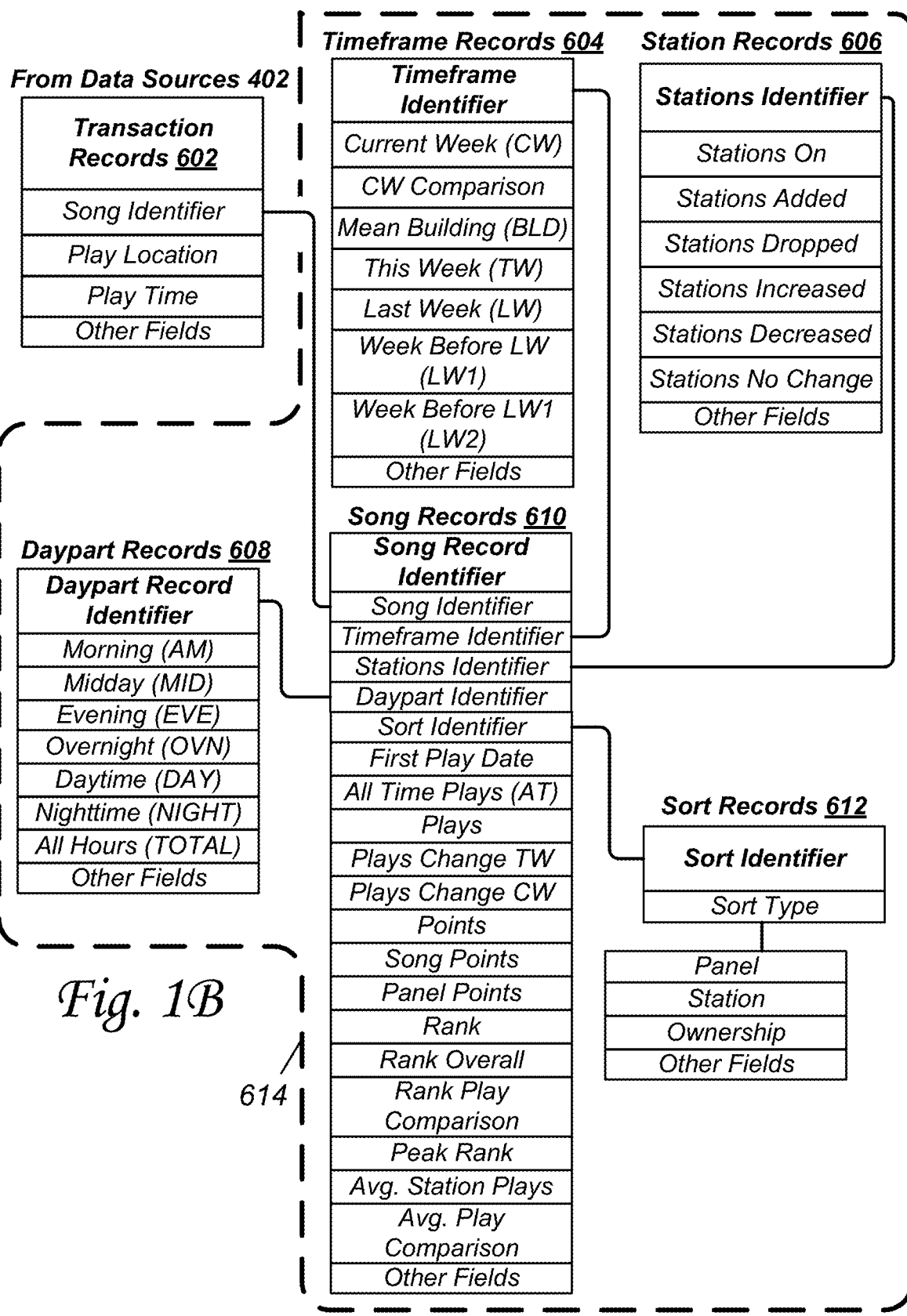
FIG. 1B illustrates one example of a database structure for evaluating song play performance of broadcast music and methods of the present invention.

Referring to FIG. 1B, there is illustrated one example of a database structure for evaluating song play performance of broadcast music and methods of the present invention. In an exemplary embodiment, at least one database 304/516 can be implemented on at least one of the data processing resources 302 or server 302, or computing device 500. In operation, such one or more databases 304/516 can be accessed/created/managed/maintained as appropriate by more than one stakeholder. In this regard, in addition to system administrators and other authorized persons, other stakeholders can access/create/manage/maintain as appropriate at least parts of the system and method of the present invention.

In an exemplary embodiment, such databases 304/516 can be SQL, MYSQL, MARIADB, ORACLE, MS ACCESS, network-accessible storage, flat files, a combination thereof, or other types and kinds of databases.

In an exemplary embodiment, the operating database 614 can comprise a series of tables, records, fields, and accounts that include timeframe records 604, station records 606, daypart records 608, song records 610, sort records 612, or other types or kinds of records as may be required and/or desired in a particular embodiment. Additionally, transaction records 402 received from data sources 402 can be stored in the operating database 614 or stored in a separate database, as may be required and/or desired in a particular embodiment.

In an exemplary embodiment, the data structure of the operating database 614 is illustrative and can be expanded and modified without particular limitation as needed and as appropriate to support the functionality and methods of the present invention and to support future functionality and methods of the present invention as it grows and evolves over time.

Figure 6:
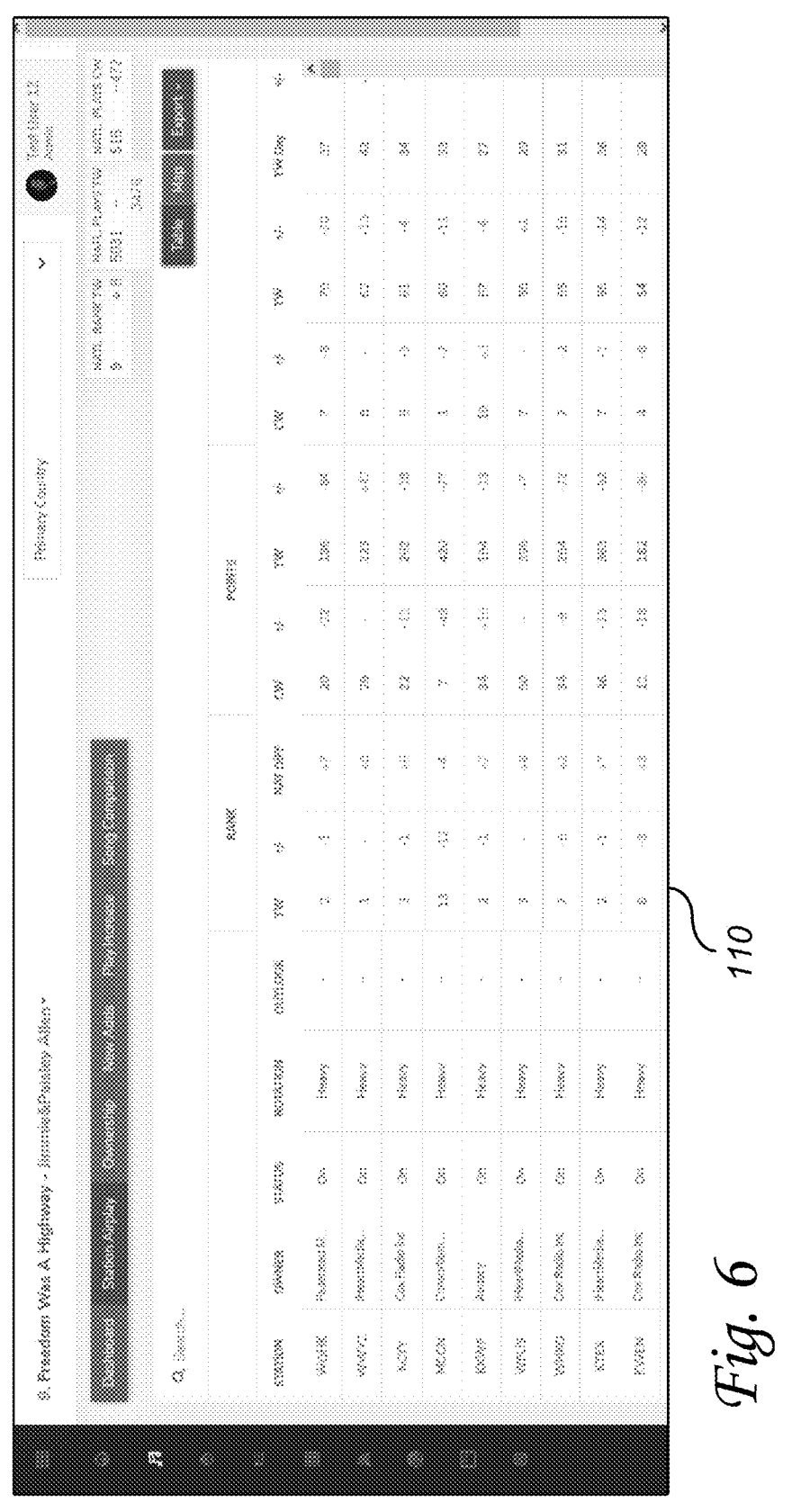
Figure 7:
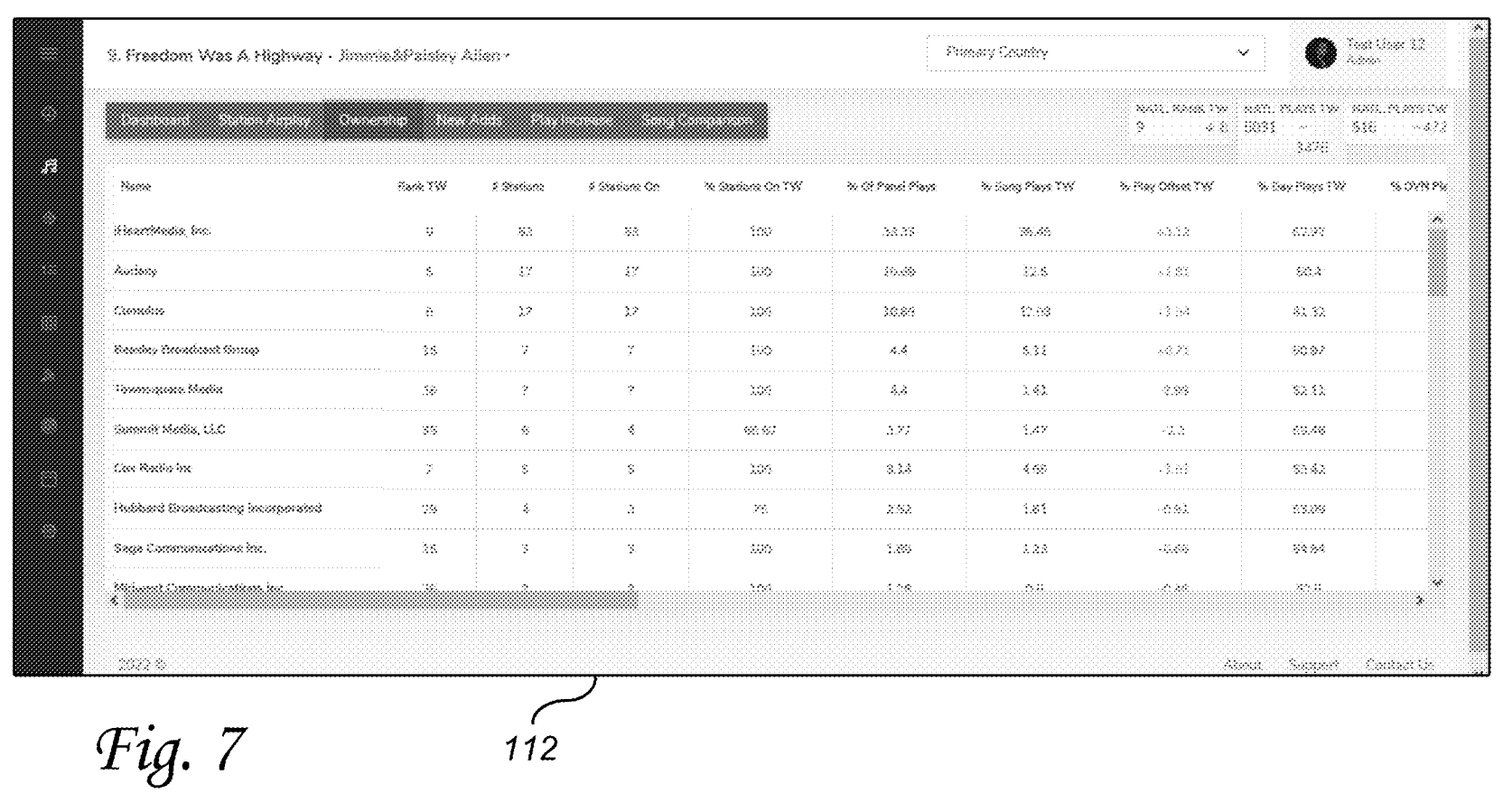

Referring to FIG. 6, there is illustrated one example of a Selected Song user interface with Station Airplay dashboard 110, and referring to FIG. 7, there is illustrated one example of a Selected Song user interface with Ownership dashboard 112.

Figure 8:
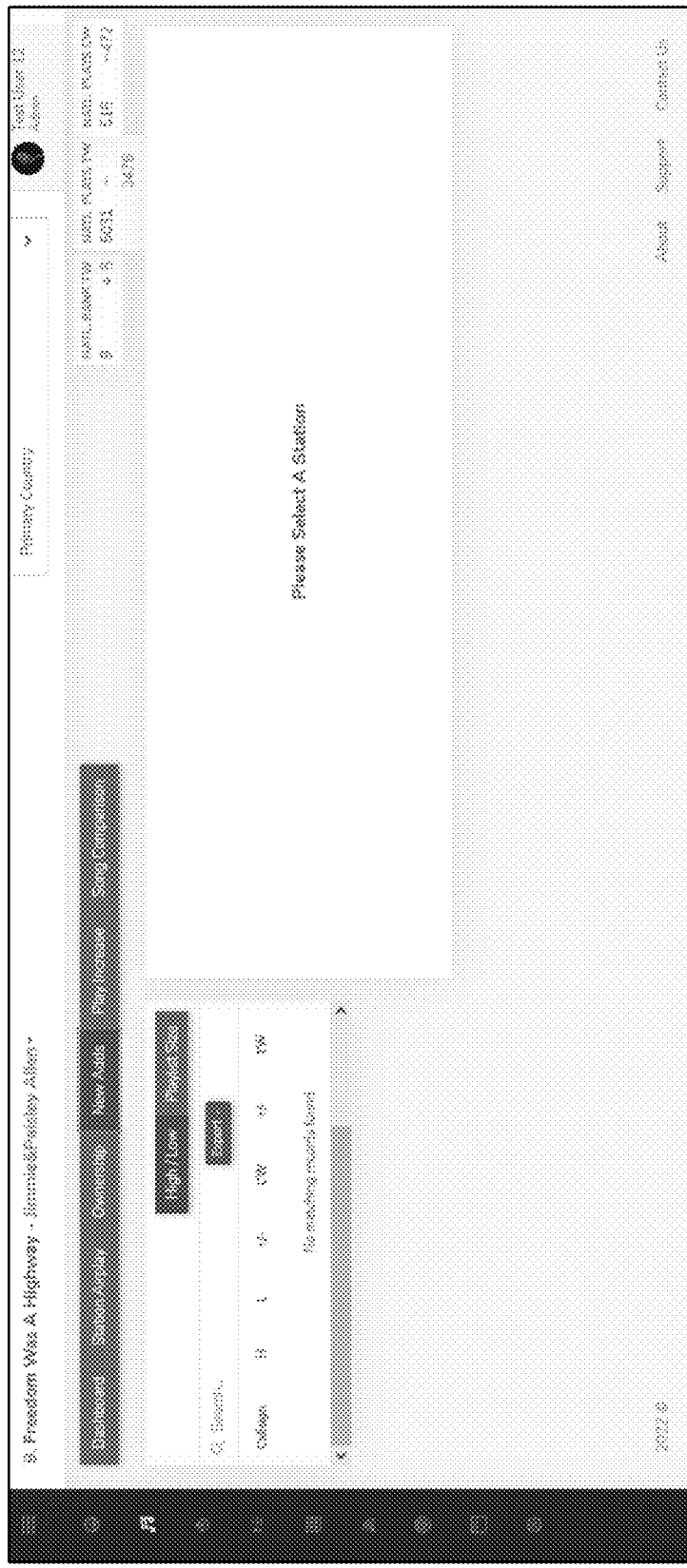
FIG. 8 illustrates one example of a Selected Song user interface with a New Adds dashboard.
Figure 9:
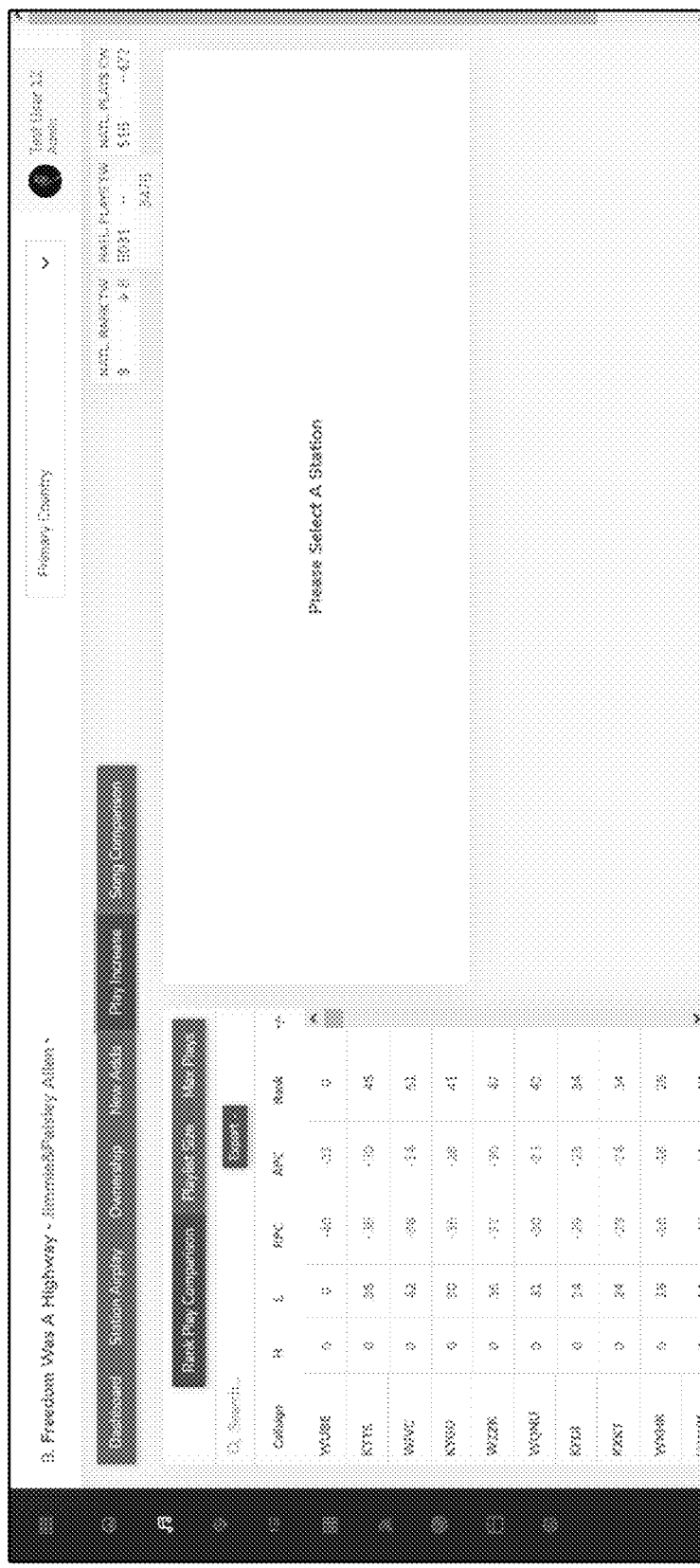
FIG. 9 illustrates one example of a Selected Song user interface with a Play Increase dashboard.

Referring to FIG. 8, there is illustrated one example of a Selected Song user interface with New Adds dashboard 114, and referring to FIG. 9, there is illustrated one example of a Selected Song user interface with Play Increase dashboard 116.

Figure 10:
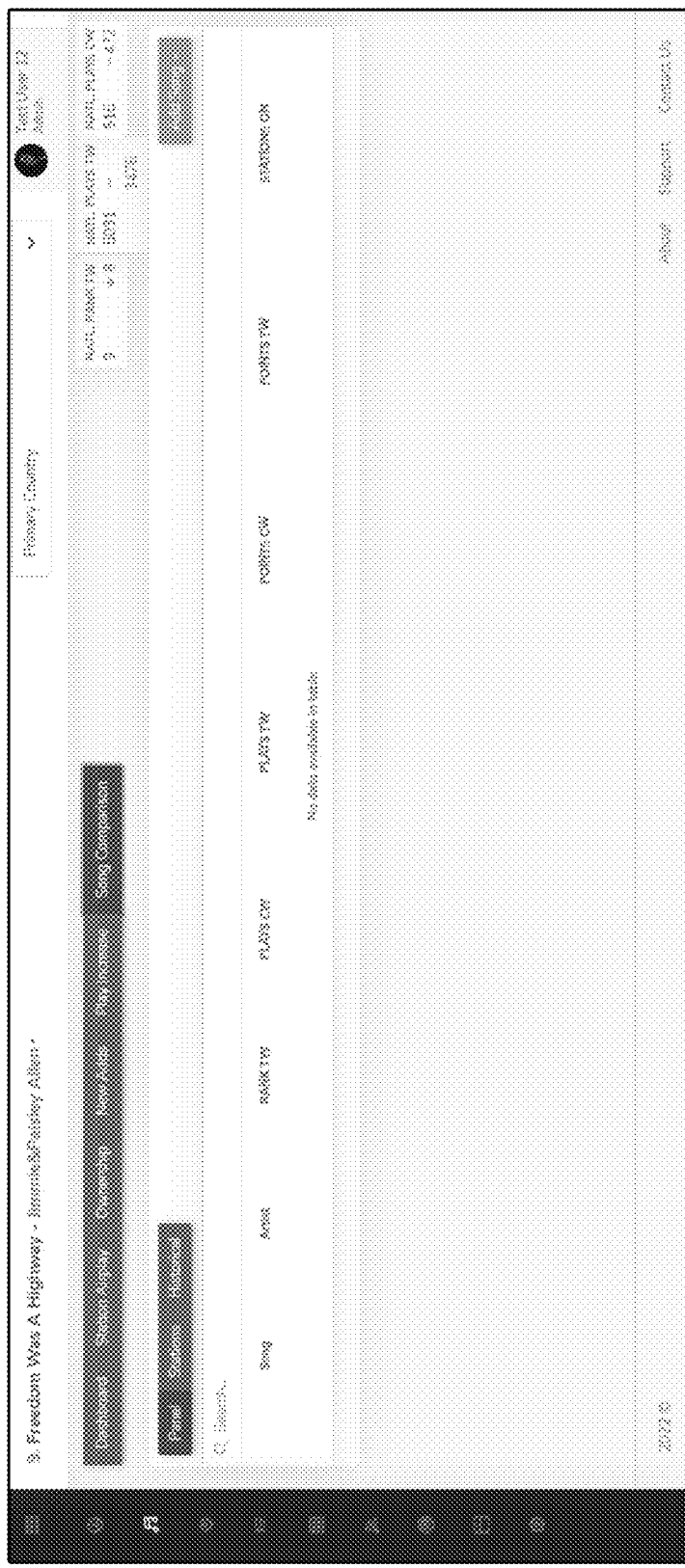
FIG. 10 illustrates one example of a Selected Song user interface with a Song Comparison dashboard.
Figure 11:
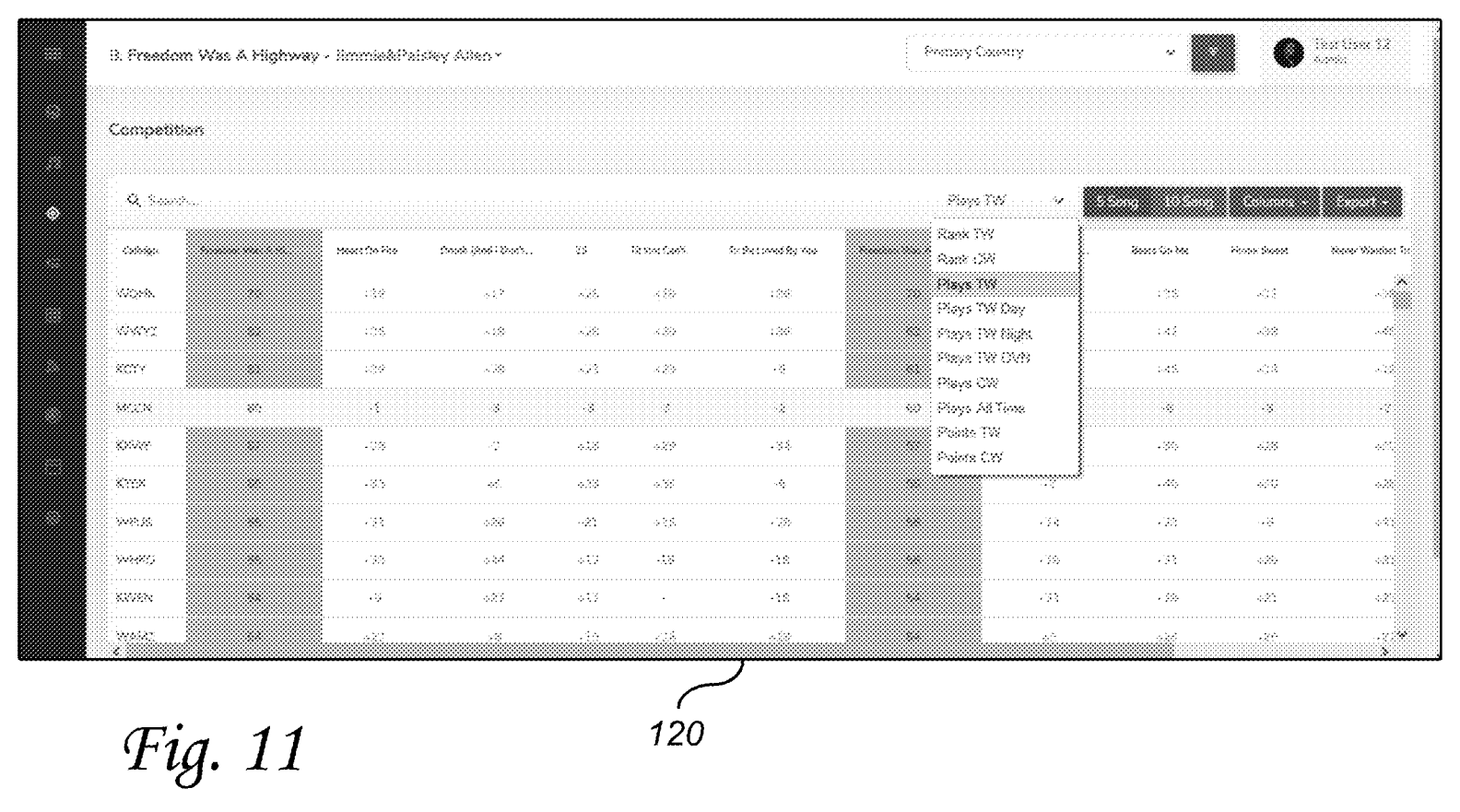

Referring to FIG. 10, there is illustrated one example of a Selected Song user interface with Song Comparison dashboard 118, and referring to FIG. 11, there is illustrated one example of a Competition user interface 120.

Figure 12:
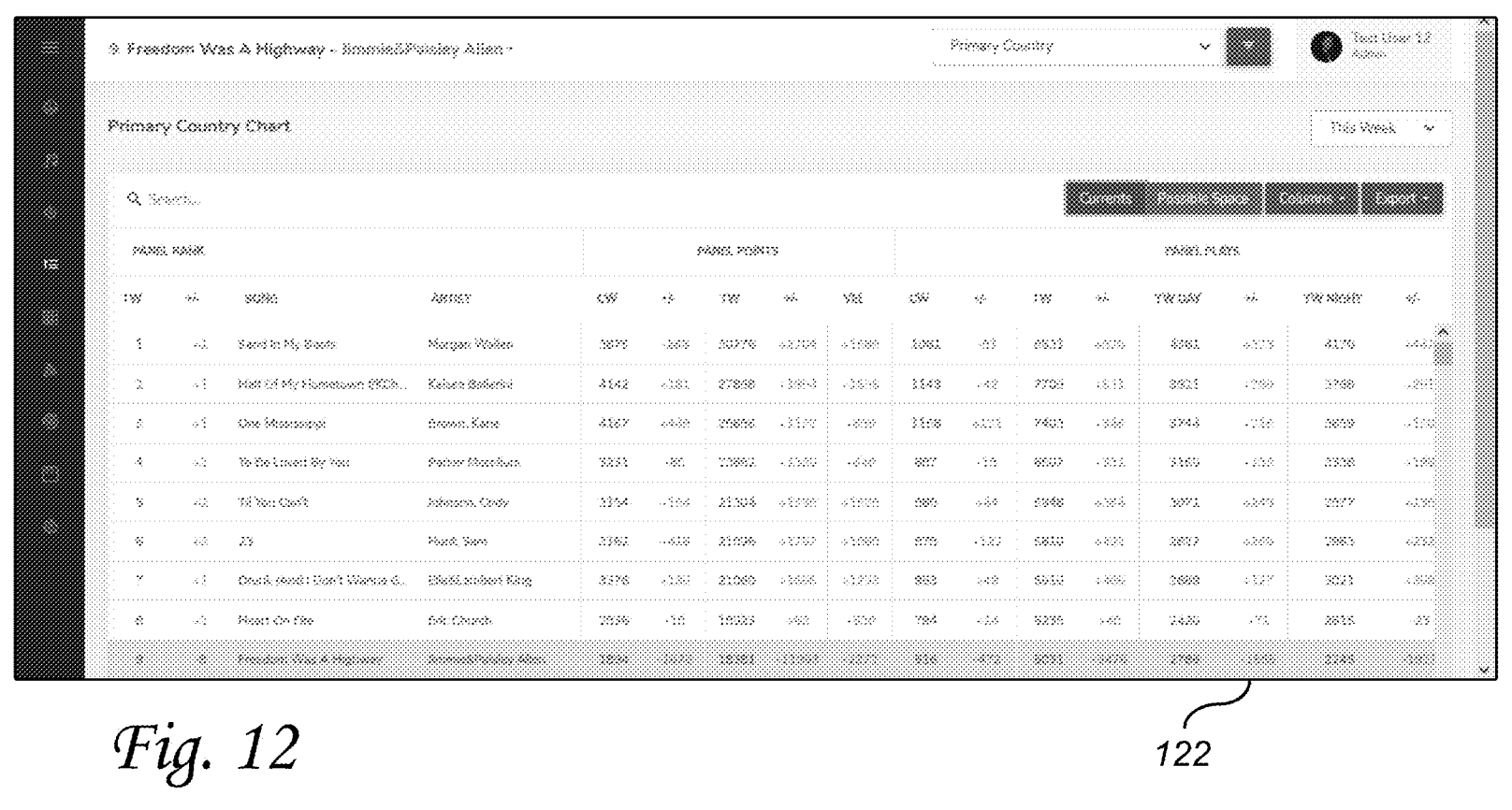
Figure 13:
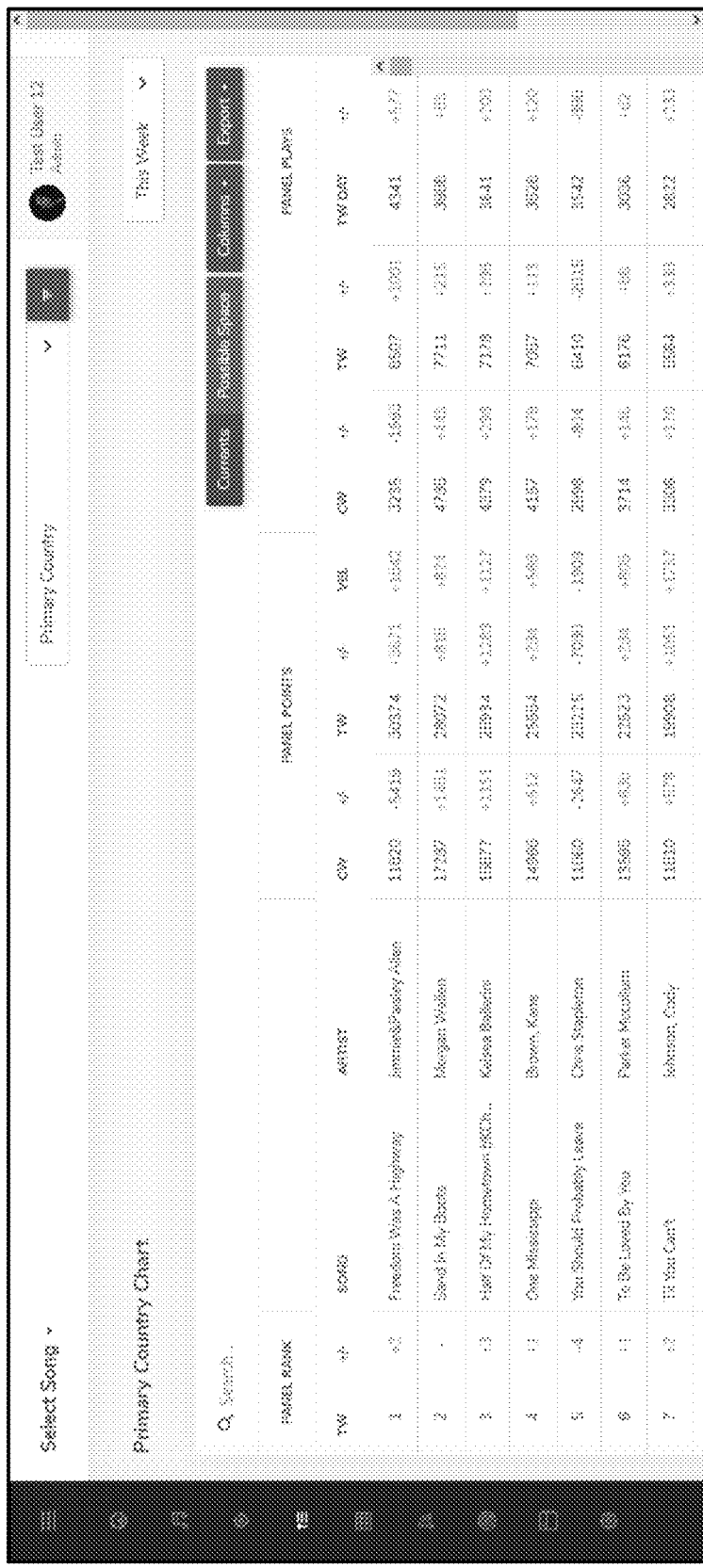
FIG. 13 illustrates one example of a Chart user interface with a Possible Space chart dashboard.

Referring to FIG. 12, there is illustrated one example of a Chart user interface with Current chart dashboard 122, and referring to FIG. 13, there is illustrated one example of a Chart user interface with Possible Space chart dashboard 124.

Figure 14:
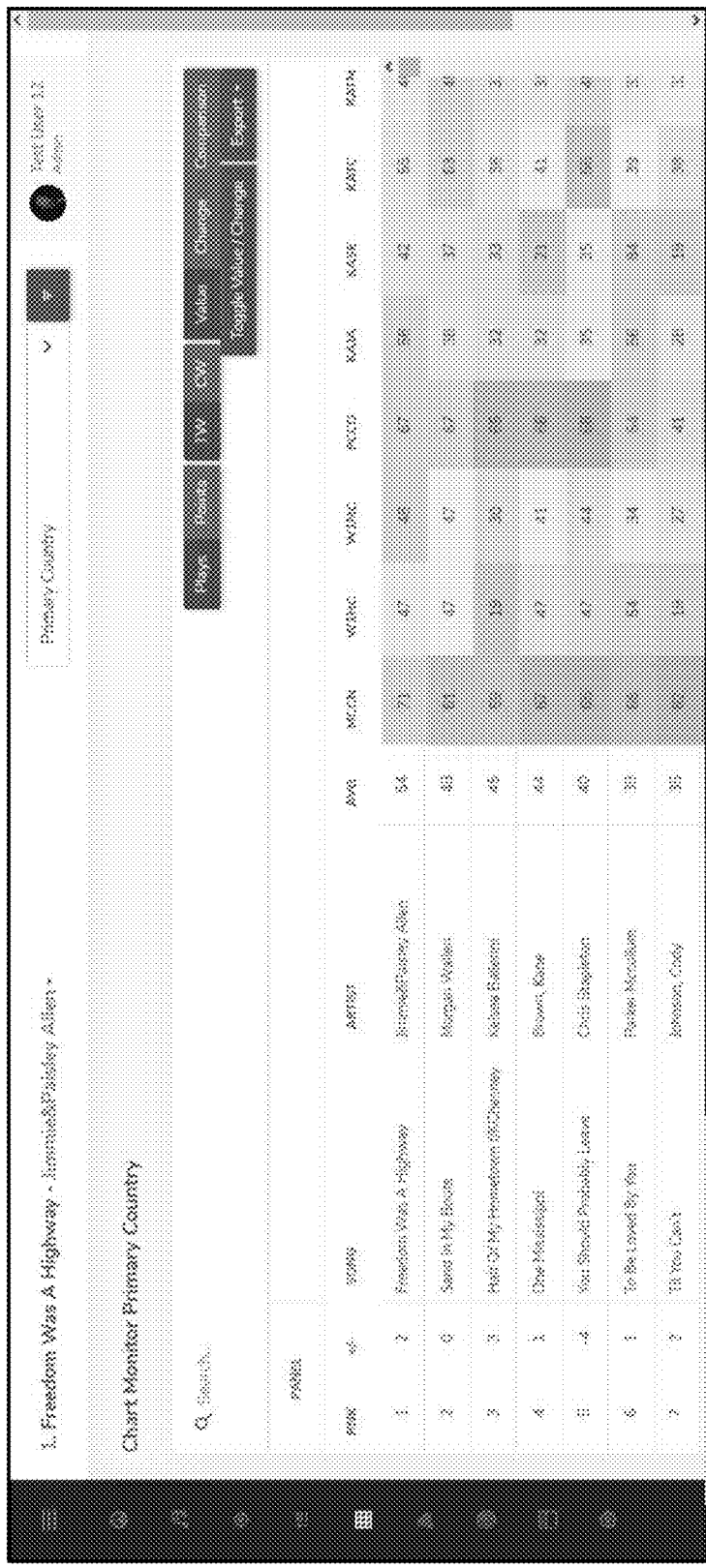
FIG. 14 illustrates one example of a Chart Monitor user interface with a Plays dashboard.
Figure 15:
FIG. 15 illustrates one example of a Chart Monitor user interface with a Points dashboard.

Referring to FIG. 14, there is illustrated one example of a Chart Monitor user interface with Plays dashboard 126, and referring to FIG. 15, there is illustrated one example of a Chart Monitor user interface with Points dashboard 128.

Figure 16:
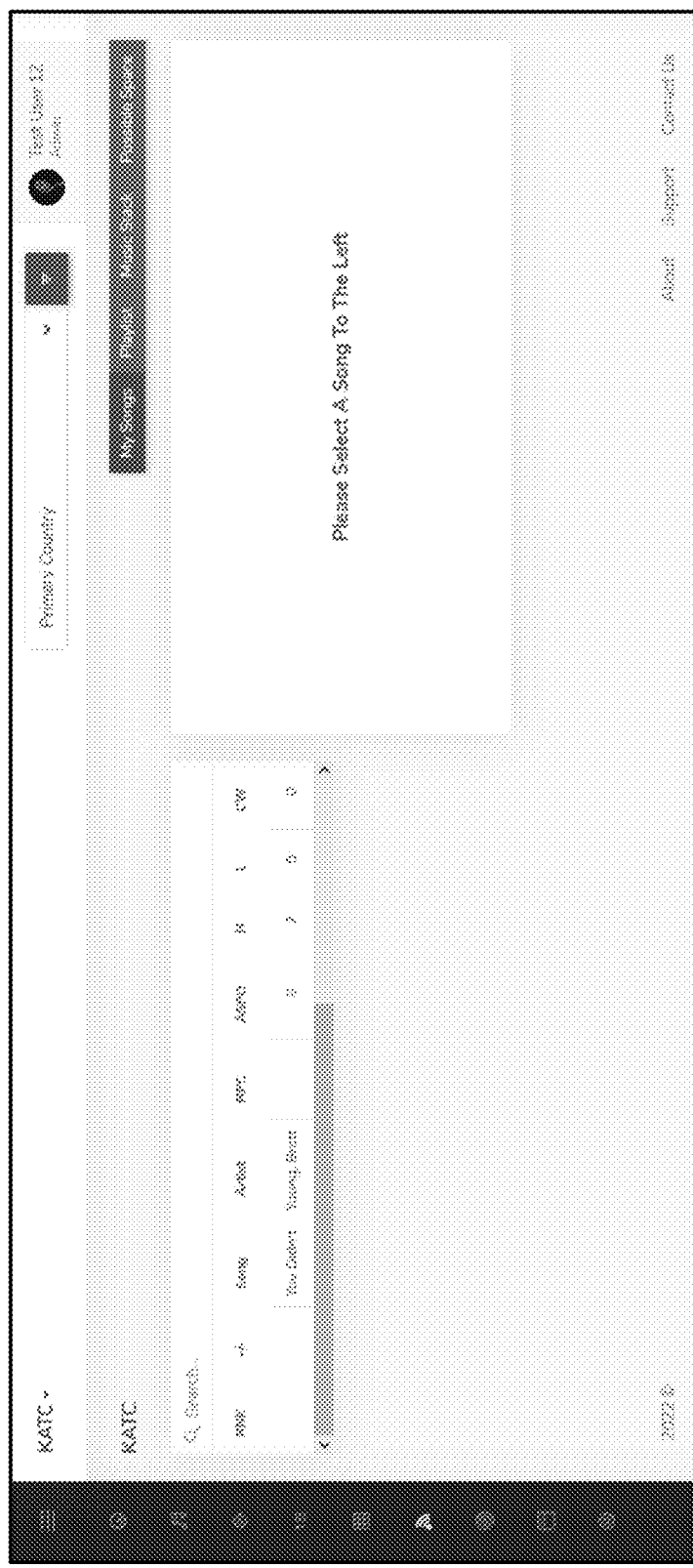
FIG. 16 illustrates one example of a Stations user interface with a My Songs dashboard.
Figure 17:
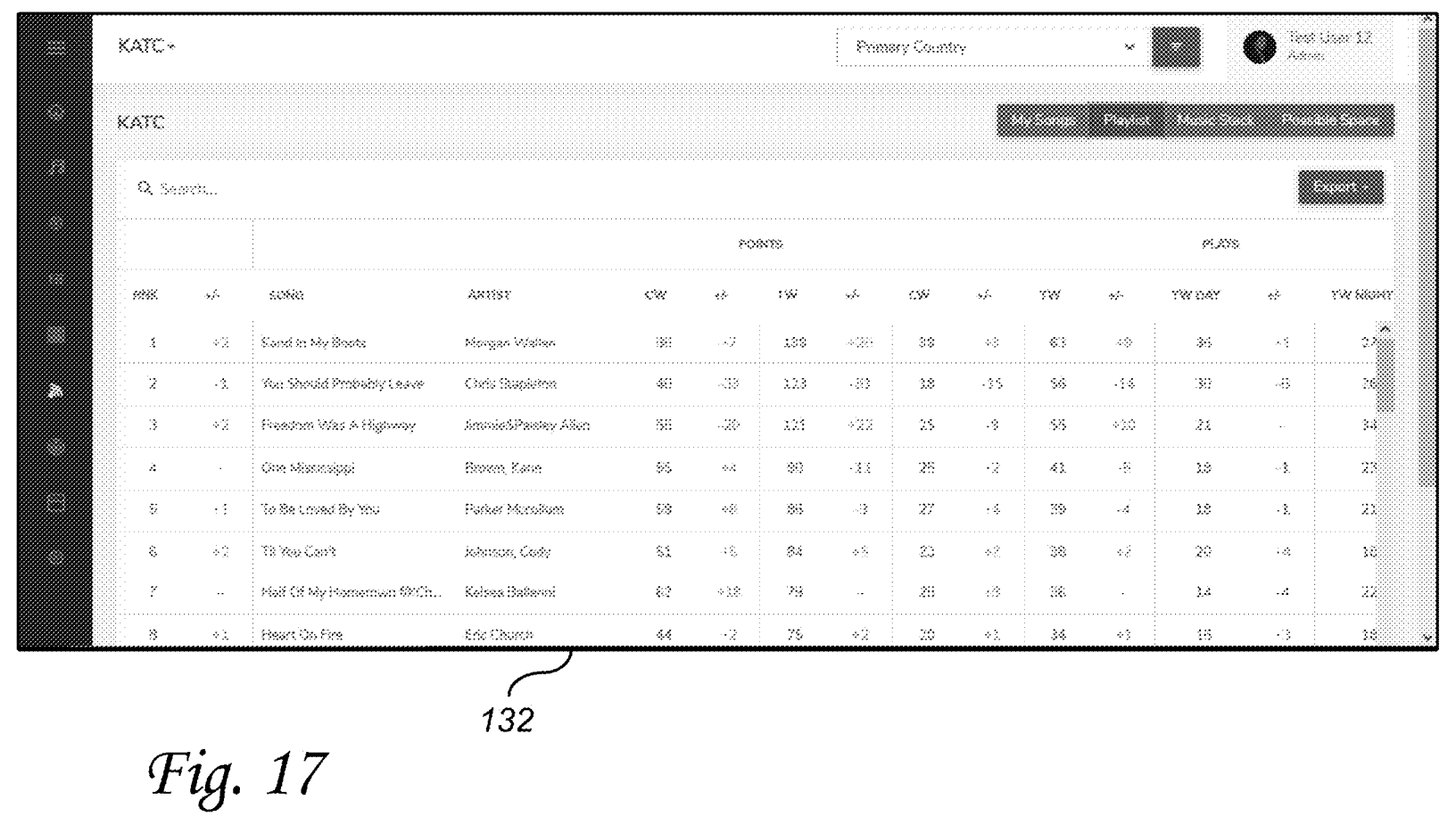

Referring to FIG. 16, there is illustrated one example of a Stations user interface with My Songs dashboard 130, and referring to FIG. 17, there is illustrated one example of a Stations user interface with Playlist dashboard 132.

Figure 18:
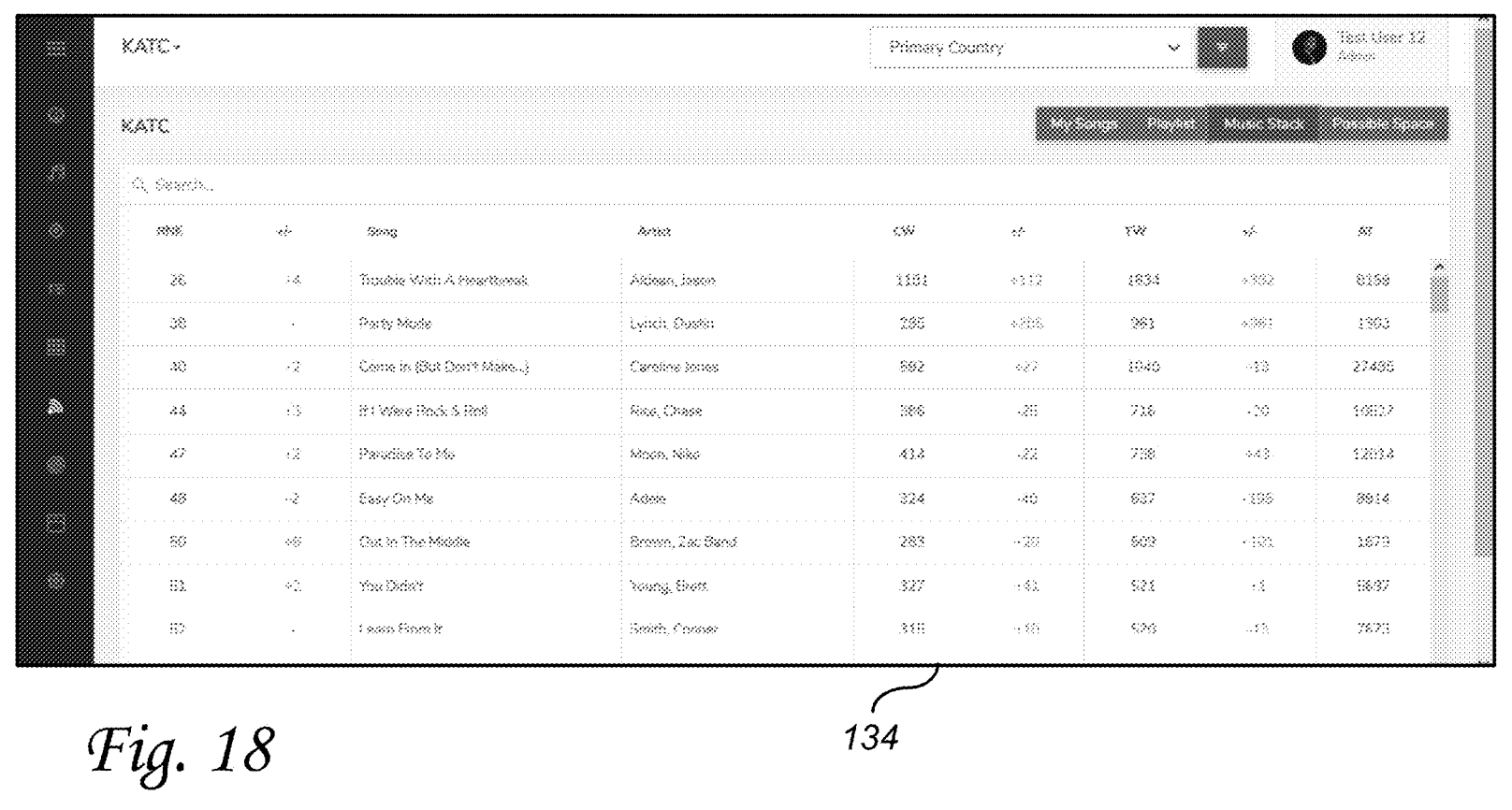
Figure 19:
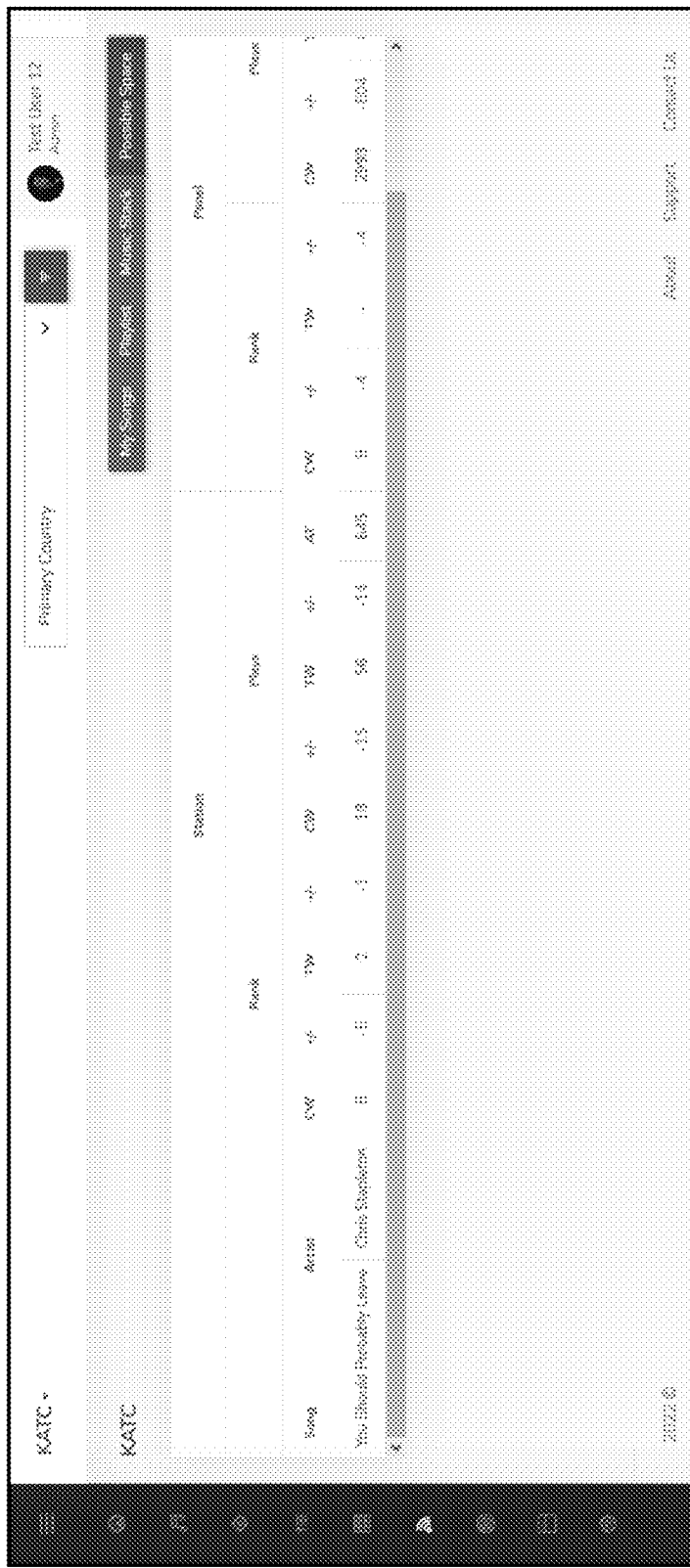
FIG. 19 illustrates a Stations user interface with My Songs dashboard a Stations user interface with Possible dashboard.
Figure 20:
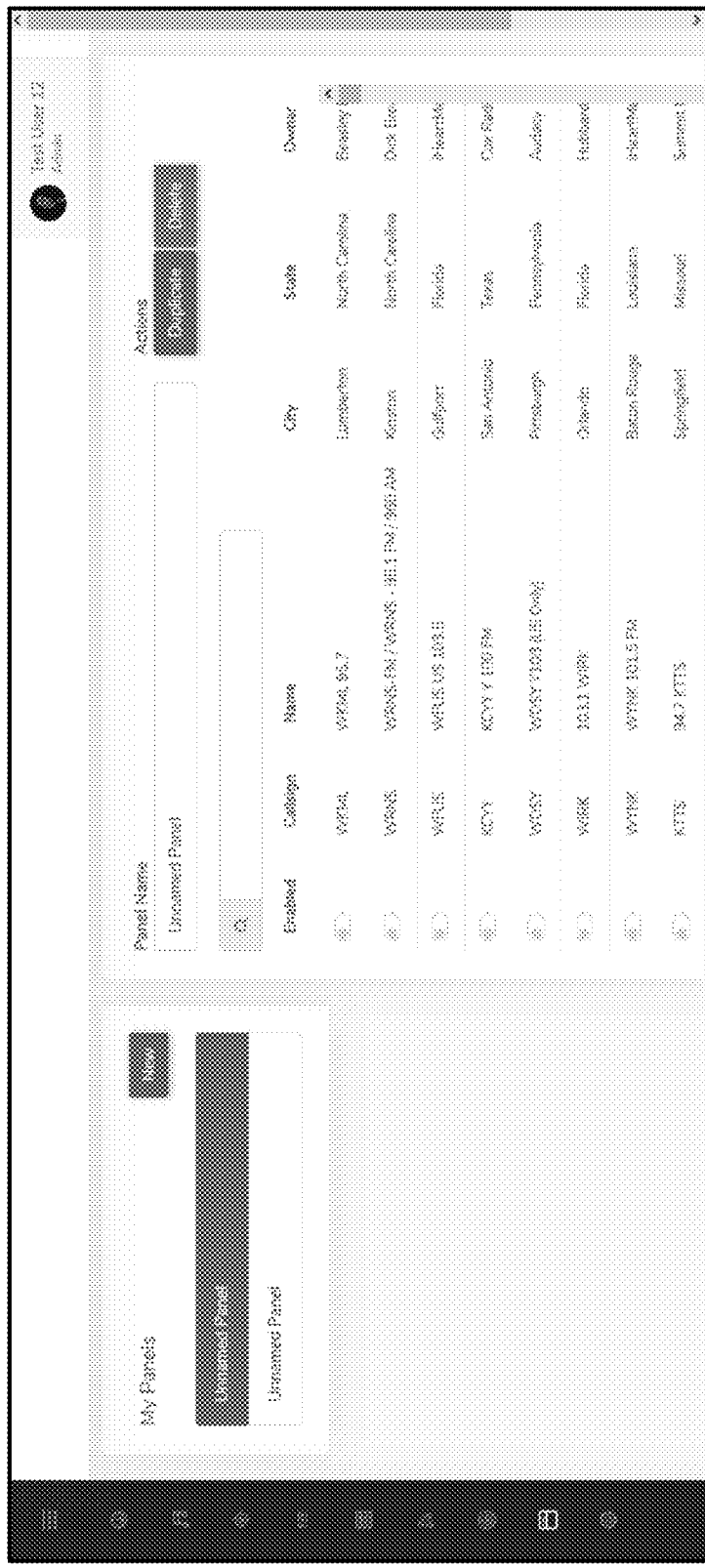
FIG. 20 illustrates one example of a Panels user interface with a dashboard.
Figure 21:
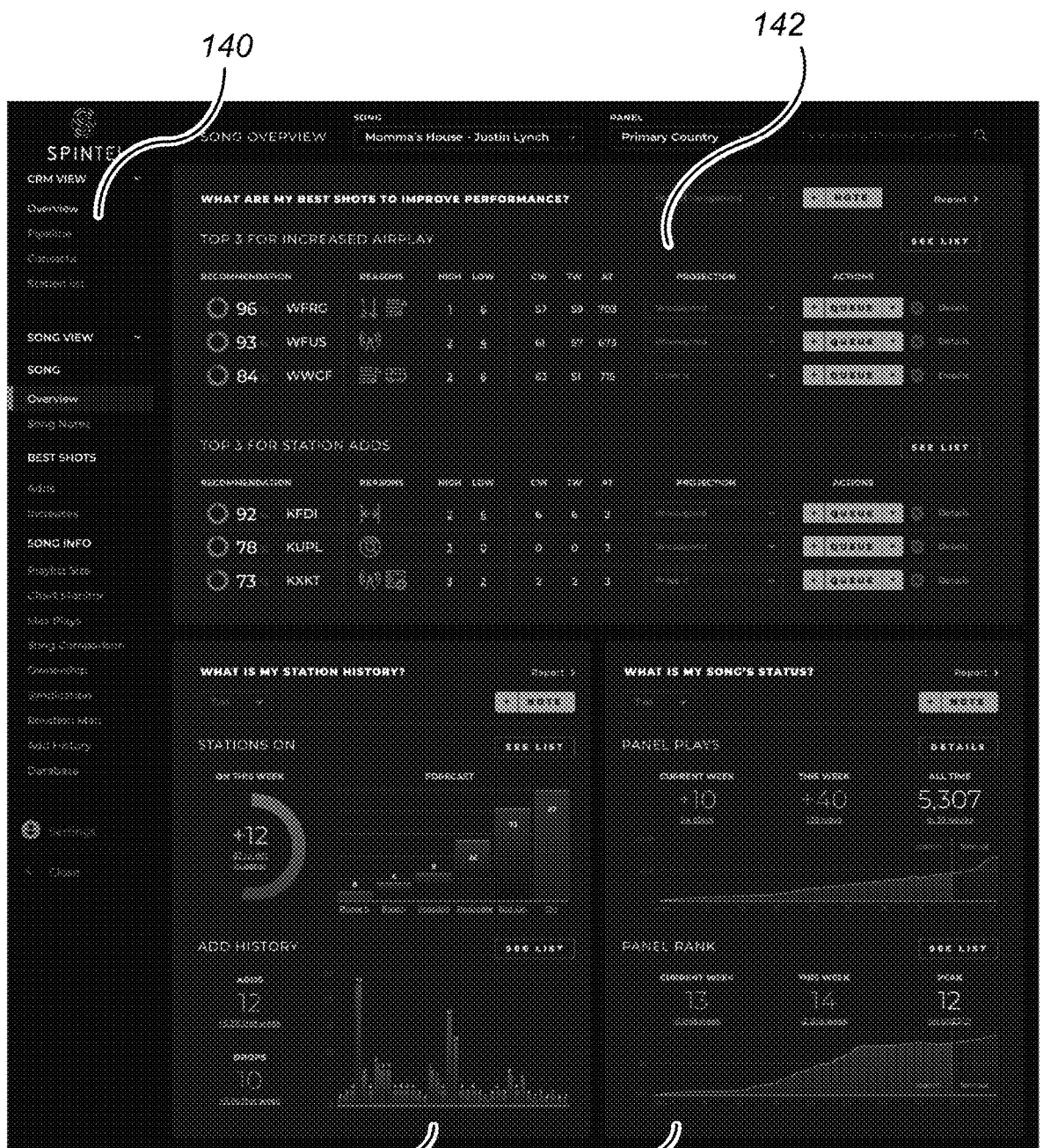
FIG. 21-25 illustrates examples of song overview dashboards.

Referring to FIG. 18, there is illustrates a Stations user interface with Music Stack dashboard 134, referring to FIG. 19, there is illustrated one example of a Stations user interface with My Songs dashboard a Stations user interface with Possible dashboard 136, and referring to FIG. 20, there is illustrated one example of a Panels user interface with dashboard 138.

Figure 22:
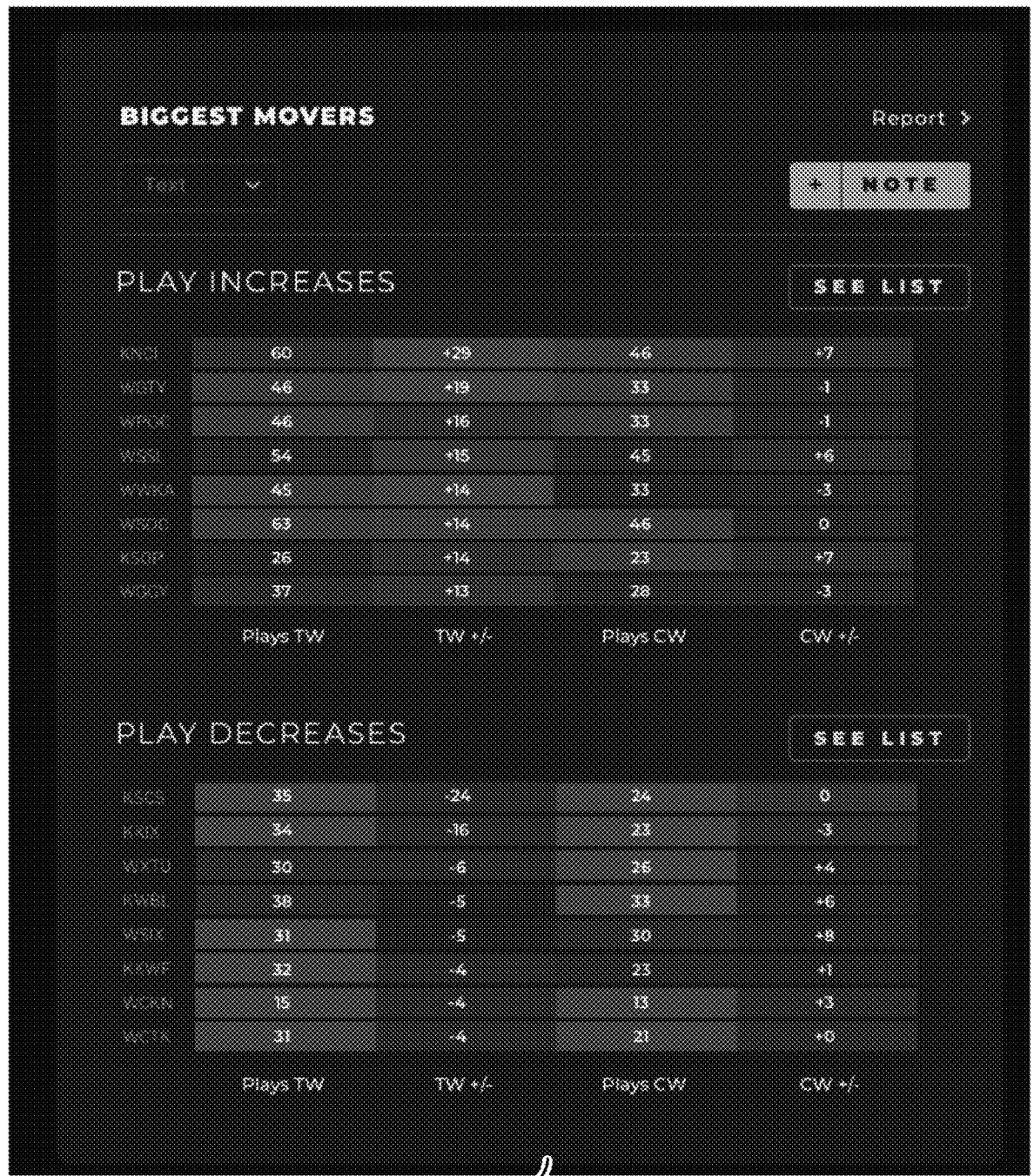
Figure 23:
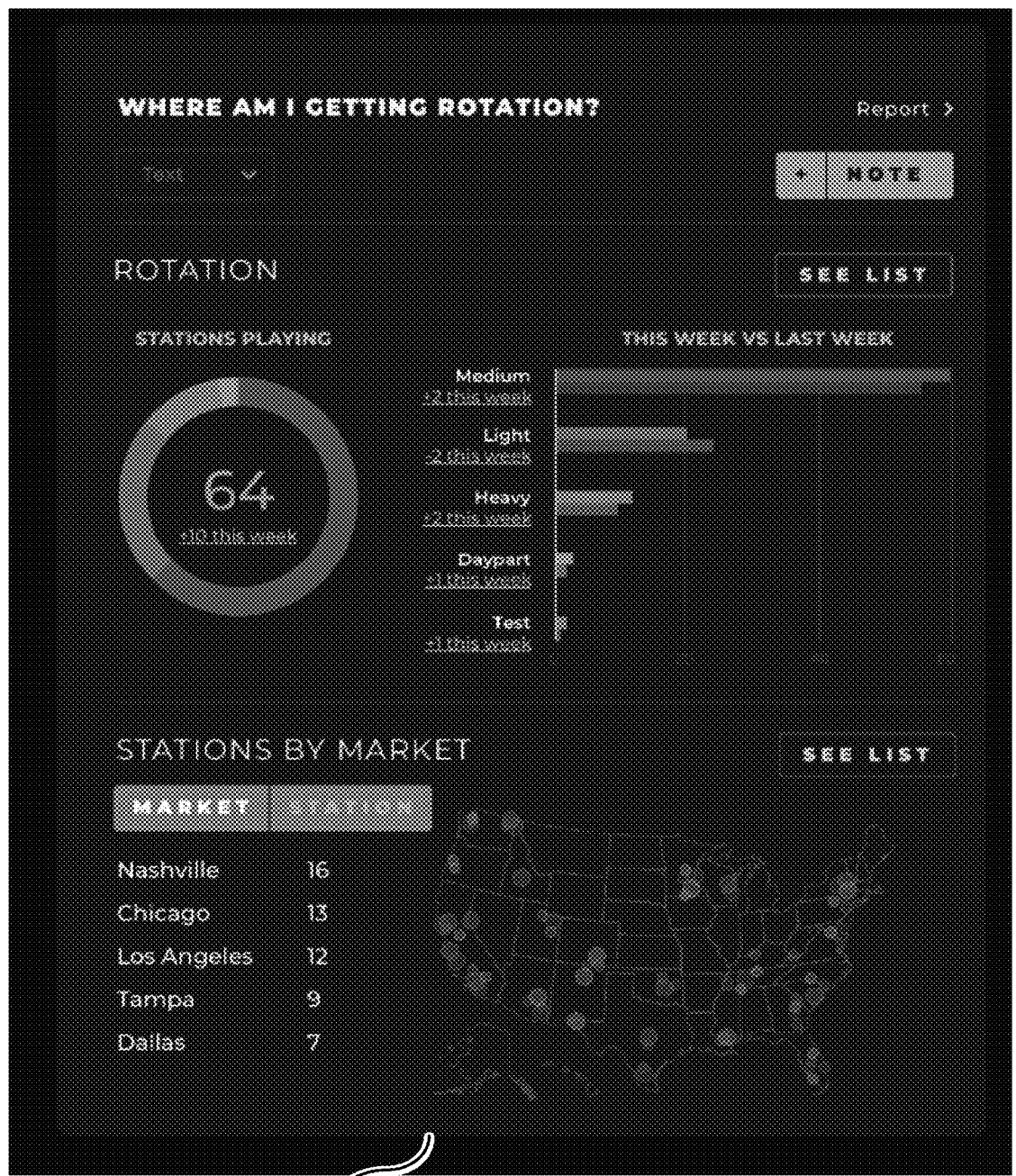
Figure 24:
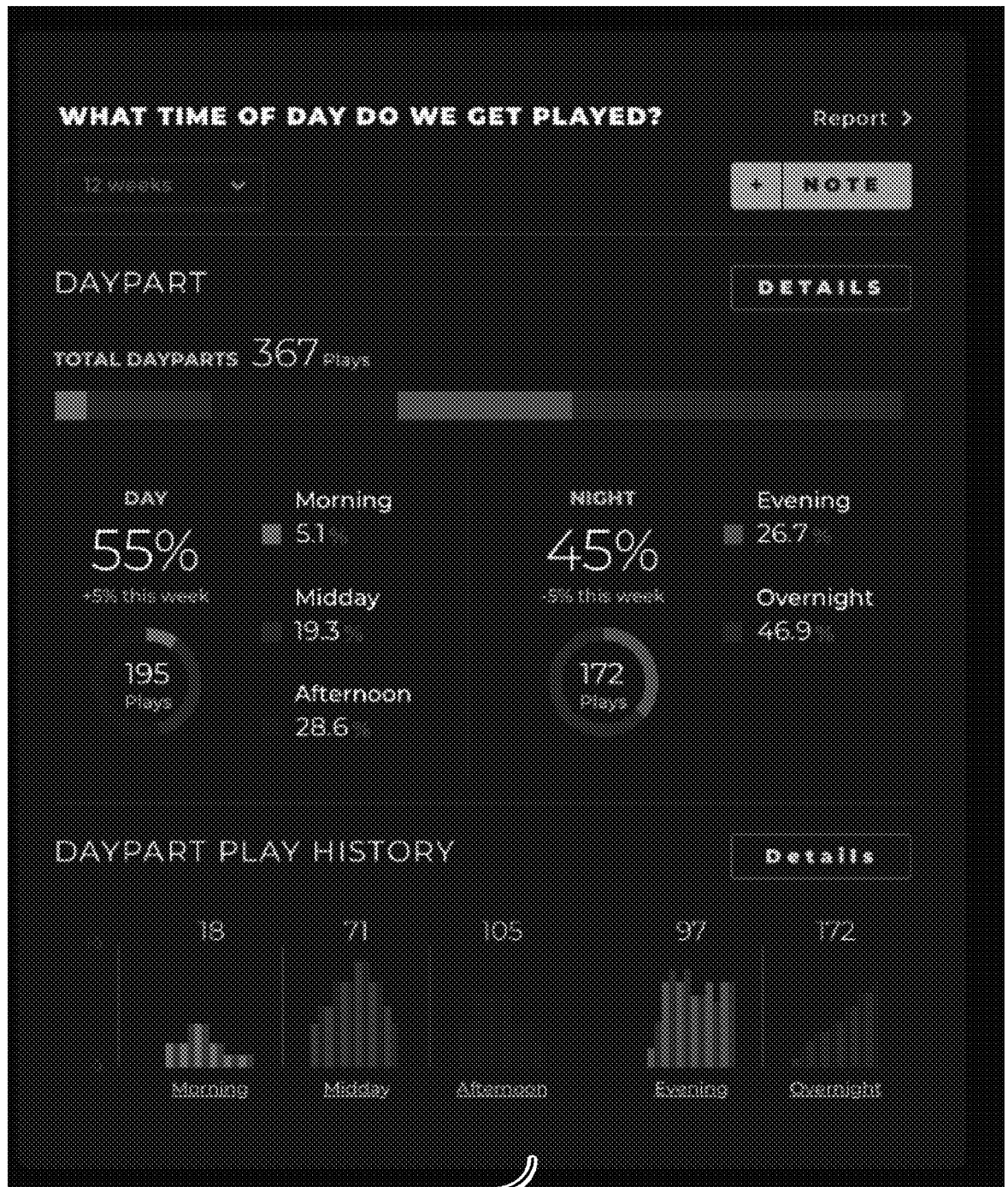
Figure 25:

Referring to FIGS. 21-25 there are illustrated examples of song overview dashboards. In an exemplary embodiment, in FIG. 21, a song overview dashboard can have a menu 140 through which a user can navigate the series of dashboard options and a 'What Are My Best Shots To Improve Performance' analysis section 142. The song overview dashboard can also include a 'What Is My Station History?' Section 144 and a 'What Is My Song's Status?' section 146. Referring to FIG. 22, the song overview dashboard can comprise a 'Biggest Movers' section 148. Referring to FIG. 23, the song overview dashboard can comprise a 'Where Am I Getting Rotation?' section 150. Referring to FIG. 24, the song overview dashboard can comprise a 'What Time of Day Do We Get Played?' section 152. Referring to FIG. 25, the song overview dashboard can comprise an 'Ownership Comparison' section 154.

Figure 26:
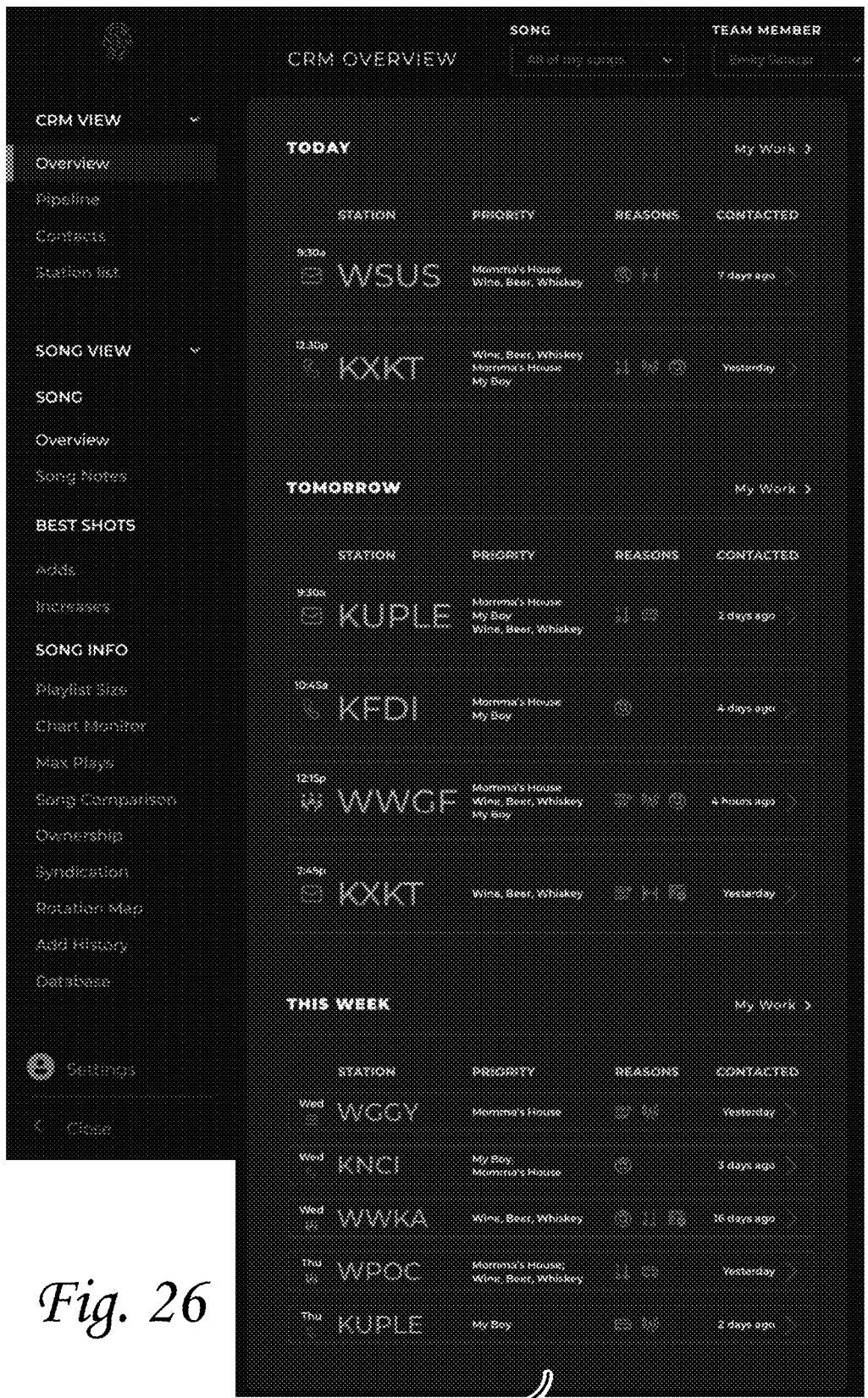
FIG. 26-28 illustrates examples of CRM overview dashboard.
Figure 27:
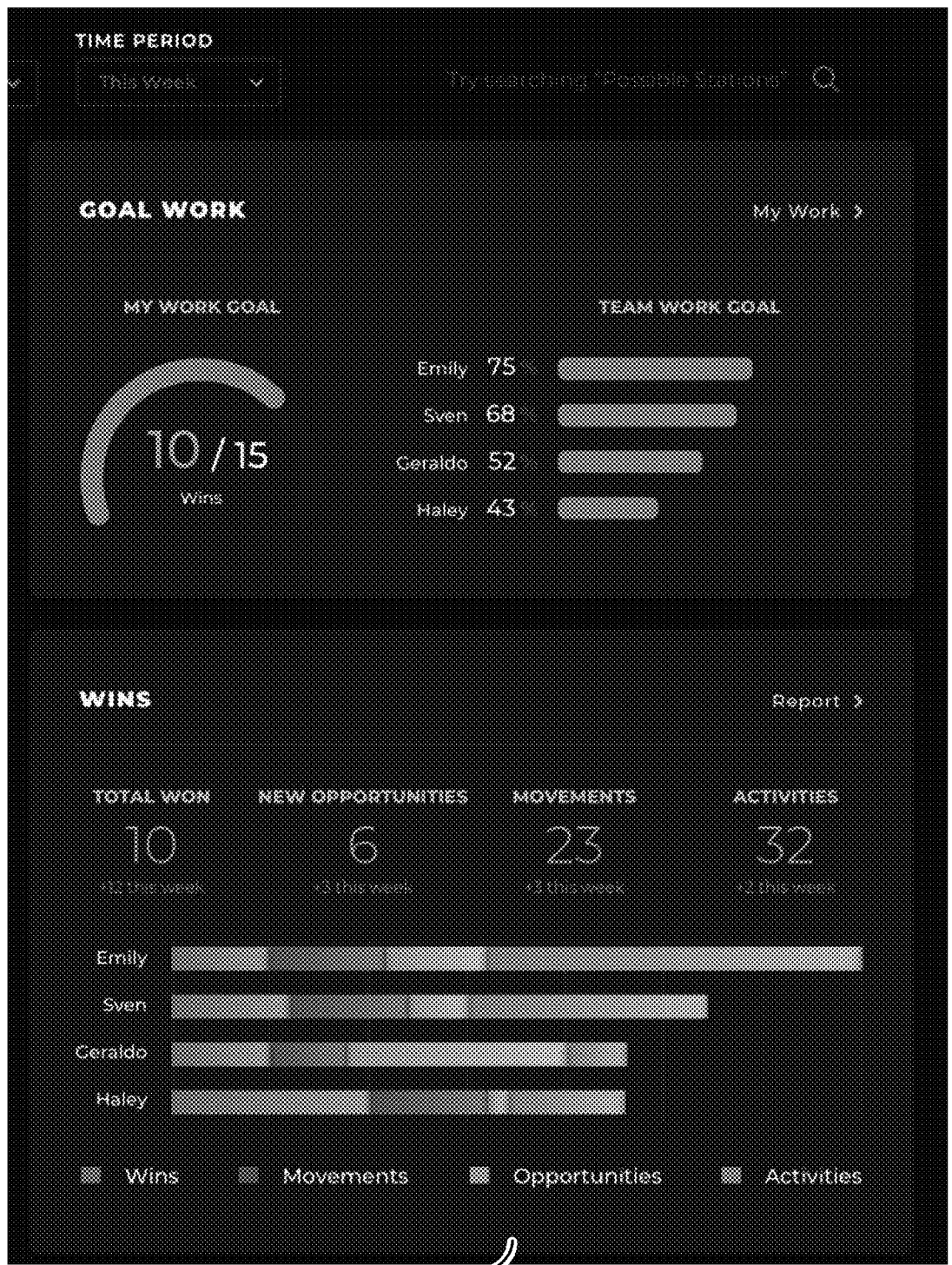
Figure 28:
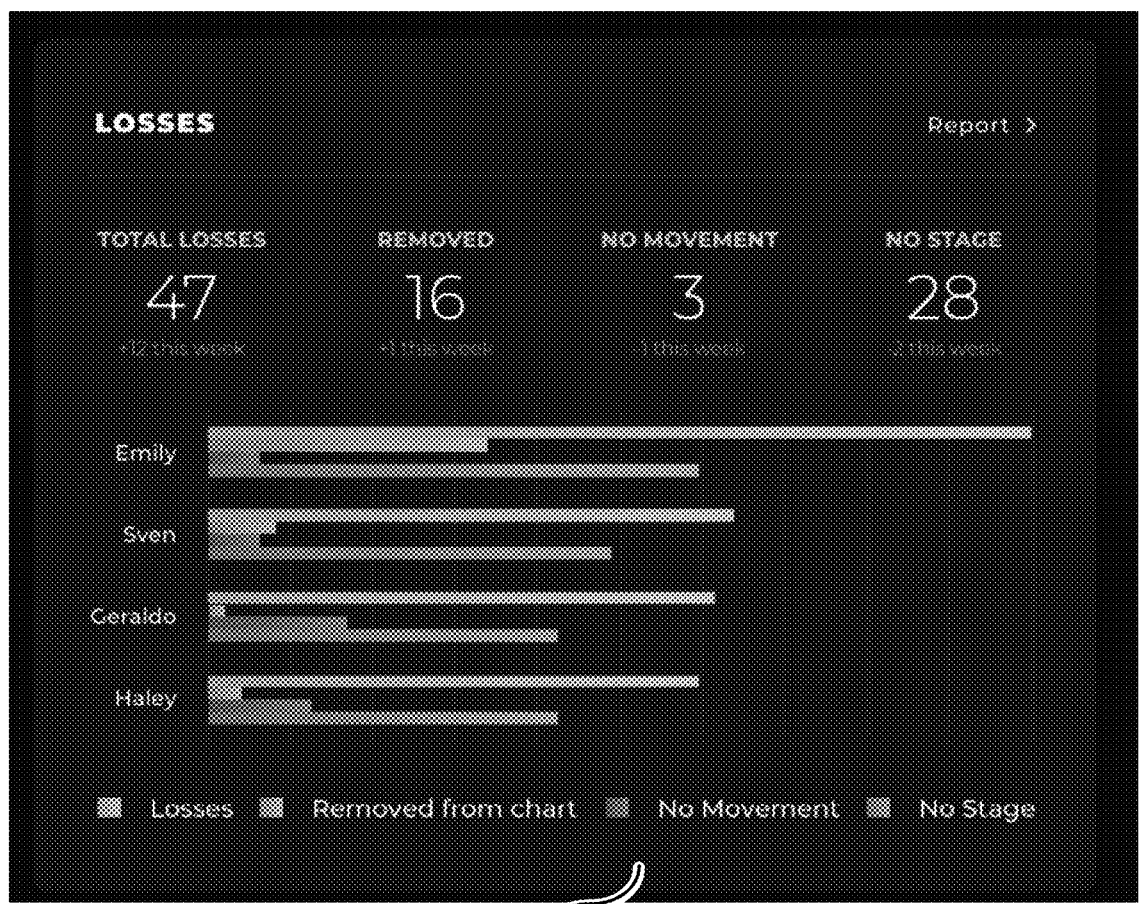

Referring to FIGS. 26-28 there are illustrated examples of CRM overview dashboards. In an exemplary embodiment, the CRM overview dashboard can comprise a 'CRM Overview' section 156. Referring to FIG. 27, the CRM overview dashboard can comprise a 'Goal Work' section 158. Referring to FIG. 28, the CRM overview dashboard can comprise a 'Losses' section 160.

Figure 29:
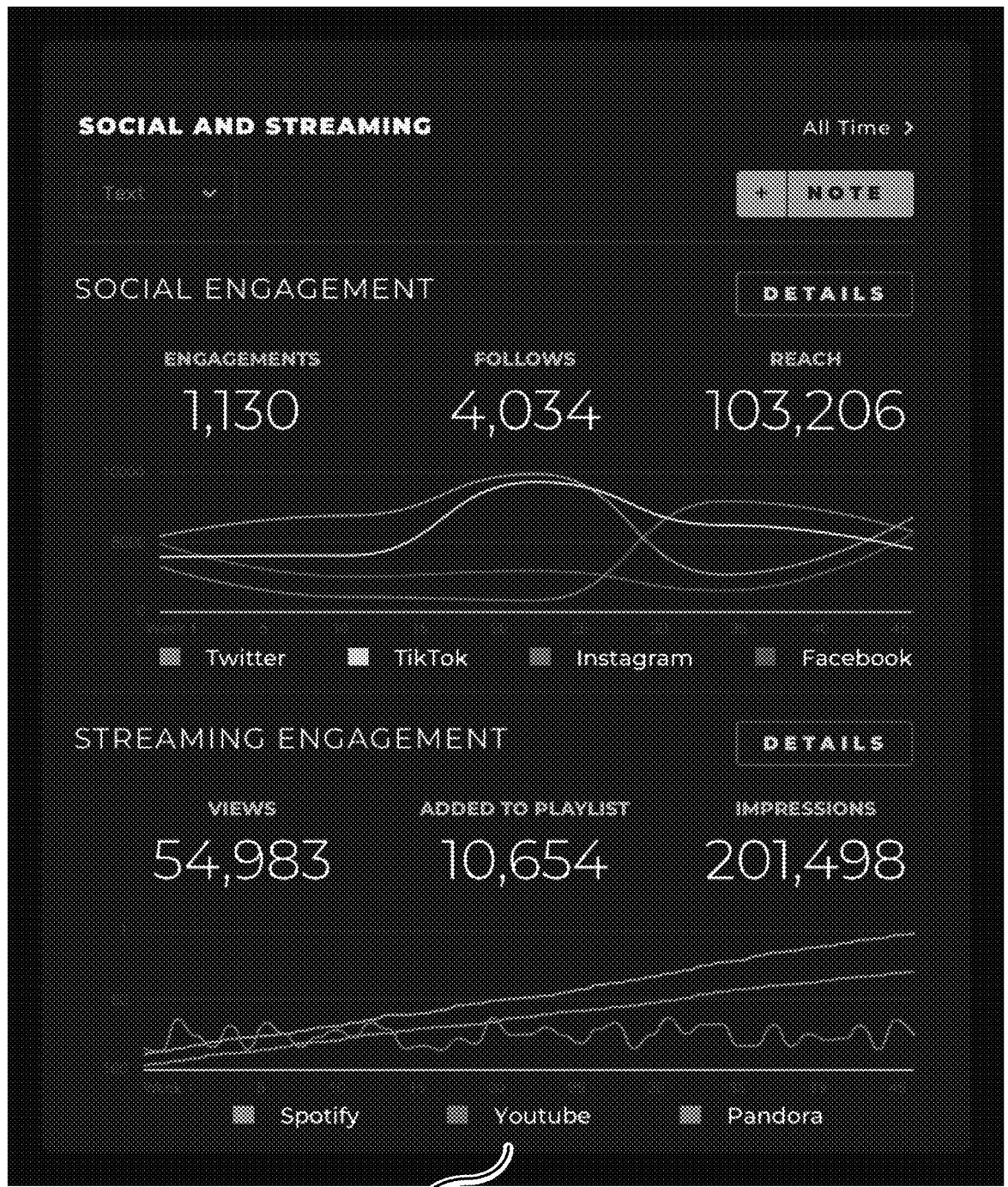
FIG. 29 illustrates one example of Social and Social Streaming dashboard.

Referring to FIG. 29, there is illustrated one example of Social and Social Streaming dashboard 162.

In the present invention, the panel chart (Current Week)+ Possible Space calculations method shows how the results are achieved involving the panel chart which contains information for three groups of songs. Primarily, when referring to the chart also referred to as panel or panel chart the default is the Chart (CURRENTS Only). These songs are the ones the primary user of the system is most interested in. However, users can switch quickly between at least three views:

Chart (CURRENTS Only);
All Songs (Includes CURRENTS, POSSIBLE SPACE, and all other songs that played on the panel for those timeframes); and
POSSIBLE SPACE (songs recently or soon to be removed from the panel chart, see below).

Figure 30:
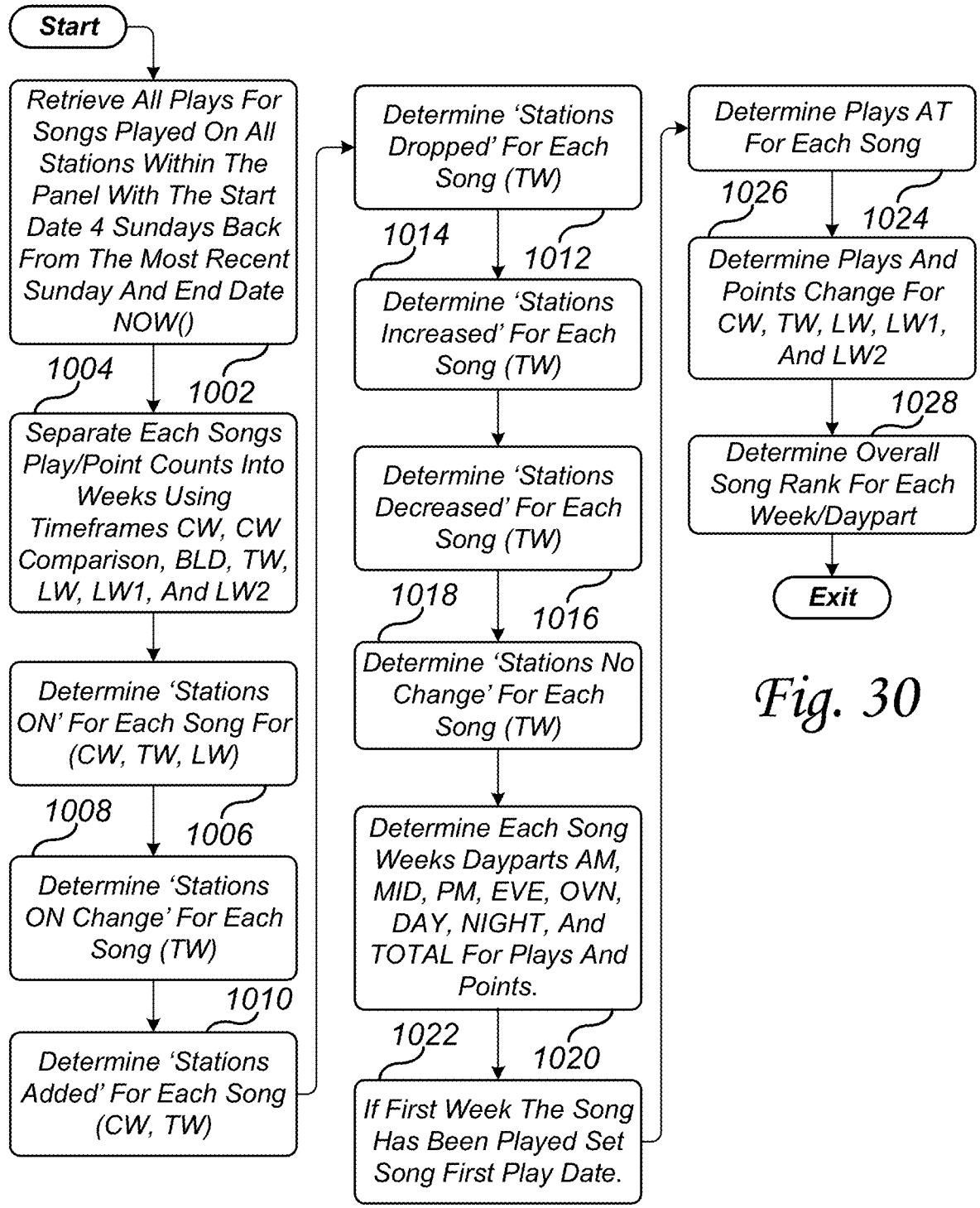
FIG. 30 illustrates one example of a panel chart (Current Week)+Possible Space calculations method that shows how the results of the present invention are achieved.

In this regard and with reference to FIG. 30, in an exemplary embodiment, the method begins in step 1002 where all plays for songs played on all stations within the panel with the start date four Sundays back from the most recent Sunday and end date NOW( ) are retrieved.

In step 1004, each song plays/points count is separated into weeks using timeframes CW, CW Comparison, BLD, TW, LW, LW1, and LW2.

In step 1006, STATIONS ON is determined for each song (CW, TW, LW).

In step 1008, STATIONS ON CHANGE is determined for each song (TW).

In step 1010, STATIONS ADDED is determined for each song (CW, TW).

In step 1012, STATION DROPPED is determined for each song (CW, TW).

In step 1014, STATIONS INCREASED is determined for each song (CW, TW).

In step 1016 STATIONS DECREASED is determined for each song (CW,TW).

In step 1018, STATIONS NO CHANGE is determined for each song (CW, TW).

In step 1020, each song week dayparts AM, MID, PM, EVE, OVN, DAY, NIGHT, and TOTAL for plays and points are determined.

In step 1022, if the first week the song has been played, set the song's first play date.

In step 1024, determine plays AT for each song.

In step 1026, determine ranking, plays, and points change for CW, TW, LW, LW1, and LW2.

In step 1028, the overall song rank for each week/daypart is determined. The method is then exited.

Figure 31:
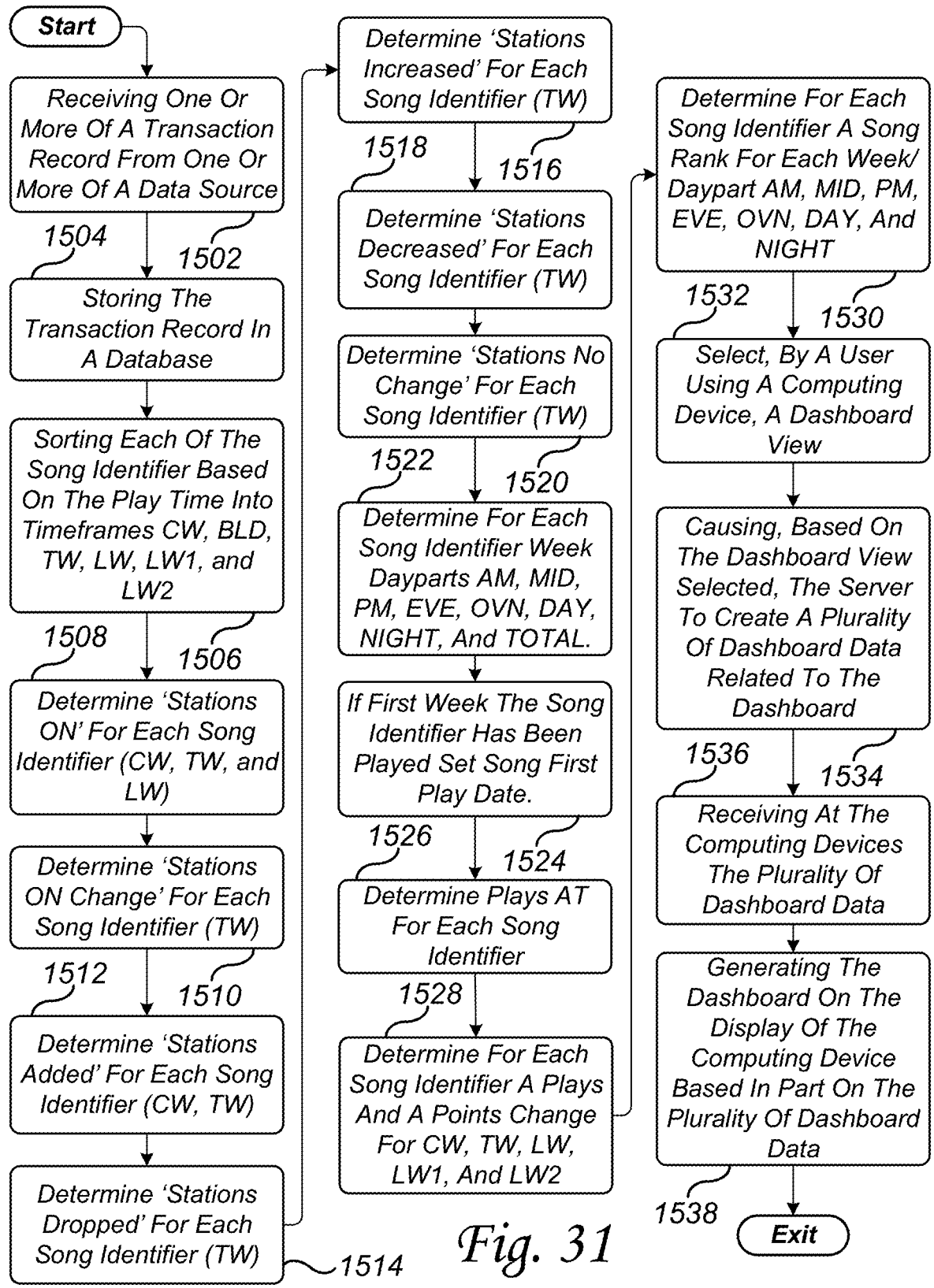
FIG. 31 illustrates one example of a method of evaluating song play performance of broadcast music.

Referring to FIG. 31, there is illustrated one example of a method of evaluating the play performance of broadcast music. In an exemplary embodiment, the data processing resource 302 also referred to as server 302 receives transaction records from data sources 402. Such transaction records 602 comprise song identifiers that are unique and identify a song down to the version of the song such as studio, live, audio, video, and other variations. Additionally, transaction record 602 comprises associated with each song identifier, the song play location, and the song play time. Such song play locations can be radio station identification, digital media systems, or other locations. The song play time can include the time which can then be used to sort the song identifiers into dayparts and other categories. In operation, the data sources 402 aggregate transaction record data from playlists and other sources. Such playlists and other sources can include radio stations 214A, digital systems 214B including podcasts, social media, and other, and other sources 214C. Certain playlists from certain radio stations and other sources can be considered representative of consumer listening trends and preferences. These playlists and associated playlists can be operated on or otherwise analyzed to develop action trends and insights. Such trends and insights are presented to an artist 702, manager 704, or authorized person 706 referred to as user 702/704/706 as airplay recommendations. Such airplay recommendations can include the identification of POSSIBLE SPACE that may exist where the user can seek to increase the number of the song plays for desired one or more of the song identifiers thus improving song rank for desired one or more of the song identifiers. POSSIBLE SPACE, on a chart, are songs also referred to as song identifiers that have recently or soon will be removed from the chart thus creating space for a different song identifier to be played or played more.

In an exemplary embodiment, the transaction records are analyzed by server 302, and a plurality of statistics, rankings, sorting, and other determinations are made. The user 702/704/706 can then select dashboards to produce meaningful insights and recommendations through evaluating song play performance of broadcast music that the user 702/704/706 can use to increase song identifier play and ranking and use in other ways. The method begins in step 1502.

In step 1502, at one or more of server 302, one or more of a transaction record 602 from one or more data sources 402 can be received. The transaction record 602 can comprise a song identifier, a song play location, and a song play time. The method then moves to step 1504.

In step 1504, at server 302, the transaction record 602 can be stored in database 304. Server 302 has data communication access to database 304. The method then moves to step 1506.

In step 1506, at the server, each of the song identifiers is sorted based on the song play time into timeframes that comprise a current week (CW), a CW comparison, a mean building (BLD), this week (TW), a last week (LW), a week before LW (LW1), and a week before LW1 (LW2). The method then moves to steps 1508-1520 where each of the following is determined:

In step 1508, STATIONS ON for each of the song identifiers within the timeframes of CW, TW, and LW.
In step 1510, STATIONS ON CHANGE for each of the song identifiers within the timeframe of TW.
In step 1512, STATIONS ADDED for each of the song identifiers within the timeframes of CW and TW.
In step 1514, STATIONS DROPPED for each of the song identifiers within the timeframe of TW.
In step 1516, STATIONS INCREASED for each of the song identifiers within the timeframe of CW and TW.
In step 1518, STATIONS DECREASED for each of the song identifiers within the timeframe of CW and TW.
In step 1520, STATIONS NO CHANGE for each of the song identifiers within the timeframe of CW and TW.

The method then moves to step 1522.

In step 1522, for each song identifier based on the song play time week a dayparts is determined for morning daypart (AM), midday daypart (MID), afternoon daypart (PM), evening day part (EVE), overnight daypart (OVN), daytime daypart (DAY), nighttime daypart (NIGHT), all-hours daypart (TOTAL). The method then moves to step 1524.

In step 1524, a first play date is determined for each of the song identifiers that previously lacked the first play date determination. The method then moves to step 1526.

In step 1526, for each song identifier an all-time (AT) historical number of plays is determined. The method then moves to step 1528.

In step 1528, for each song identifier, a song plays and a points change is determined for timeframes of CW, TW, LW, LW1, and LW2. The method then moves to step 1530.

In step 1530, for each song identifier, a song rank is determined for dayparts of AM, MID, PM, EVE, OVN, DAY, NIGHT, and TOTAL. The method then moves to step 1532.

In step 1532, a user 702/704/706 using one or more of a computing device 500 selects a dashboard to view. The computing device 500 data communicates by way of a global network 200 with server 302. The method then moves to step 1534.

In step 1534, based in part on the dashboard selected, the server accesses or otherwise operates on data to create a plurality of dashboard data related to the dashboard. In this regard, at least some of the following is data accessed or otherwise operated on: one or more of the transaction records, the CW, the CW comparison, the BLD, the TW, the LW, the LW1, the LW2, the STATIONS ON, the STATIONS ON CHANGE, the STATIONS ADDED, the STATIONS DROPPED, the STATIONS INCREASED, the STATIONS DECREASED, the STATIONS NO CHANGE, the first play date, the AM, the MID, the PM, the EVE, the OVN, the DAY, the NIGHT, the TOTAL, or the AT. The method then moves to step 1536.

In step 1536, the plurality of dashboard data related to the dashboard is received, at computing device 500, from server 302. The method then moves to step 1538.

In step 1538, the dashboard is generated on the display of the computing device 500 comprising indicia or graphics based in part on the plurality of dashboard data. In operation, the user 702/704/706 can evaluate the play performance of one or more of the song identifiers, the song play location, and the song play time.

Figure 32:
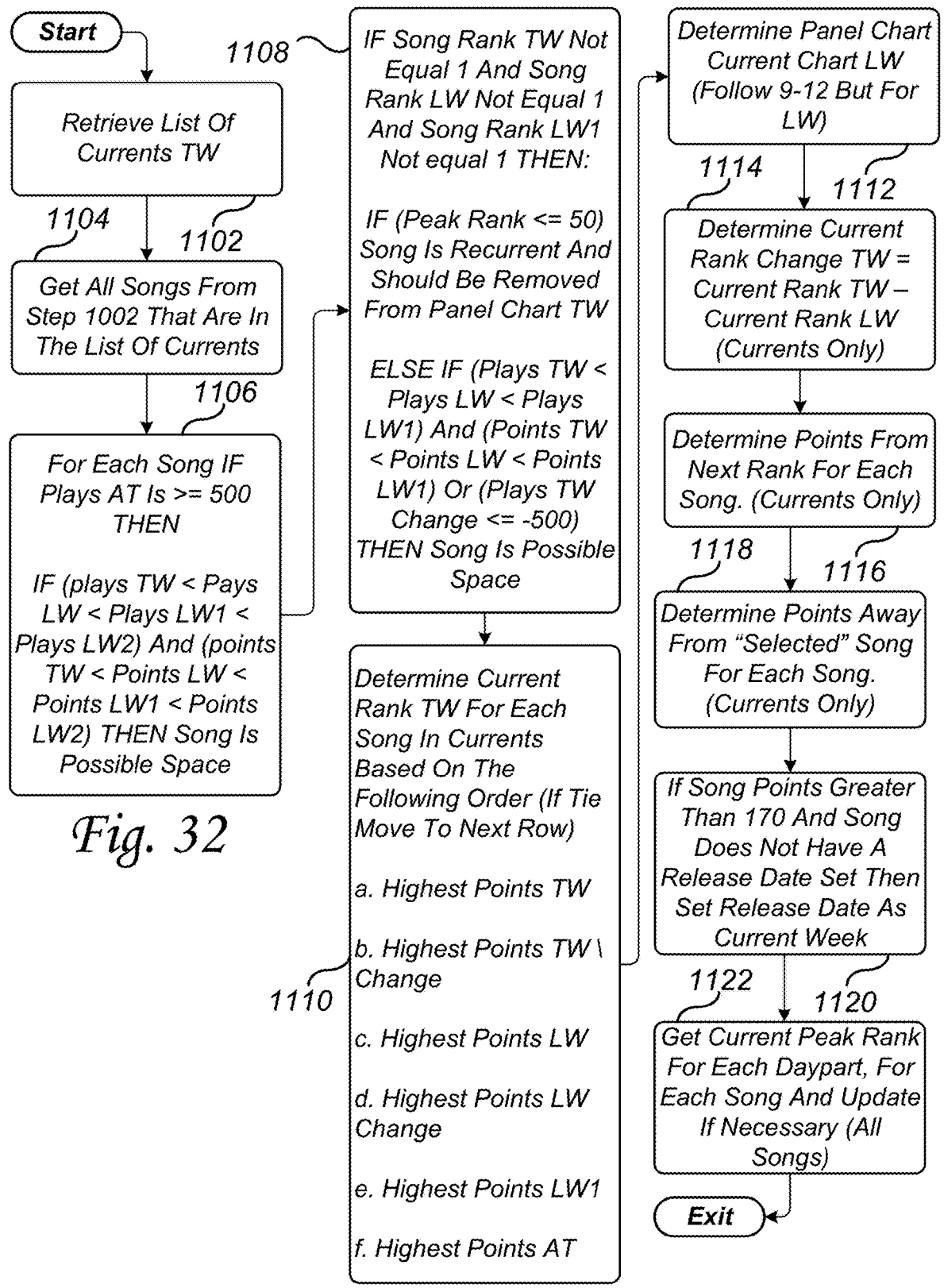
FIG. 32 illustrates one example of a panel chart current chart TW calculations method that shows how the results of the present invention are achieved.

In an exemplary embodiment and with reference to FIG. 32, the panel chart current chart TW calculations method that shows how the results of the present invention are achieved begins in step 1102 a list of CURRENTS TW is retrieved.

In step 1104, all songs from step 1102 that are in the list of CURRENTS are gotten.

In step 1106, for each song IF plays AT is >=500 THEN IF (plays TW<plays LW<plays LW1<plays LW2) AND (points TW<points LW<points LW1<points LW2) THEN Song Is Possible Space.

In step 1108, IF Song Rank TW NOT EQUAL 1 AND Song Rank LW NOT EQUAL 1 AND Song Rank LW1 NOT EQUAL 1 THEN IF (peak rank<=50) THEN Song Is Recurrent and should be removed from panel chart TW ELSE IF (plays TW<plays LW<plays LW1) AND (points TW<points LW<points LW1) OR (plays TW Change<=−500) THEN Song Is Possible Space.

In step 1110 The current rank TW is determined for each song in CURRENTS based on the following order (If a tie then move to the next row):
  a. Highest Points TW;
  b. Highest Points TW Change;
  c. Highest Points LW;
  d. Highest Points LW Change;
  e. Highest Points LW1; or
  f. Highest Points AT.

In step 1112, Panel Chart Current Chart LW is determined (Follow 9-12 but for LW).

In step 1114, Current Rank Change TW=Current Rank TW−Current Rank LW is determined (CURRENTS Only).

In step 1116, points from the next rank for each song are determined (CURRENTS Only).

In step 1118, points away from the "selected" song for each song are determined (CURRENTS Only).

In step 1120, if the song points greater than 170 and the song does not have a release date set then set the release date as the current week.

In step 1122, get the current peak rank for each daypart, for each song, and update if necessary (All Songs). The method is then exited.

In an exemplary embodiment, when finished the following metrics for each song will have been determined, noting these metrics will not all be displayed, however, they can be made accessible after calculating the panel chart:

For Songs Release Date, and Weeks Out (Weeks since release date).
For Stations:
  STATIONS ON, CW, TW, LW, Change (TW), number of stations, percentage of stations;
  STATIONS ADDED CW and TW;
  STATIONS DROPPED TW;
  STATIONS INCREASED CW and TW;
  STATIONS DECREASED CW and TW; and
  STATIONS NO CHANGE CW and TW.
For "Stations" each metric should contain references to the stations that make up the number count so their information can be quickly retrieved on hover or other action.
For SONG PLAYS:
  CW, CW Comparison, BLD, TW, LW, LW1, LW2, AM, MID, PM, EVE, OVN, DAY, NIGHT, TOTAL;
  Change (CW, TW, LW), AM, MID, PM, EVE, OVN, DAY, NIGHT, TOTAL;
  AT;
  Points, CW, CW Comparison, BLD, TW, LW, LW1, LW2, AM, MID, PM, EVE, OVN, DAY, NIGHT, TOTAL;
  Change (CW, TW, LW), AM, MID, PM, EVE, OVN, DAY, NIGHT, TOTAL;
  Points AT;
  Points From Next Rank (CURRENTS Only); and
  Points From Selected Song (CURRENTS Only).
For Rank Overall:
  Overall—All Songs, CW, TW, LW, AM, MID, PM, EVE, OVN, DAY, NIGHT, and TOTAL; and
  Change (CW, TW), AM, MID, PM, EVE, OVN, DAY, NIGHT, and TOTAL.
For Rank CURRENTS:
  CURRENTS—Only CURRENTS CW, TW, LW, AM, MID, PM, EVE, OVN, DAY, NIGHT, and TOTAL;
  Change (CW, TW) AM, MID, PM, EVE, OVN, DAY, NIGHT, and TOTAL; and
  Peak AM, MID, PM, EVE, OVN, DAY, NIGHT, and TOTAL.

Figure 33A:
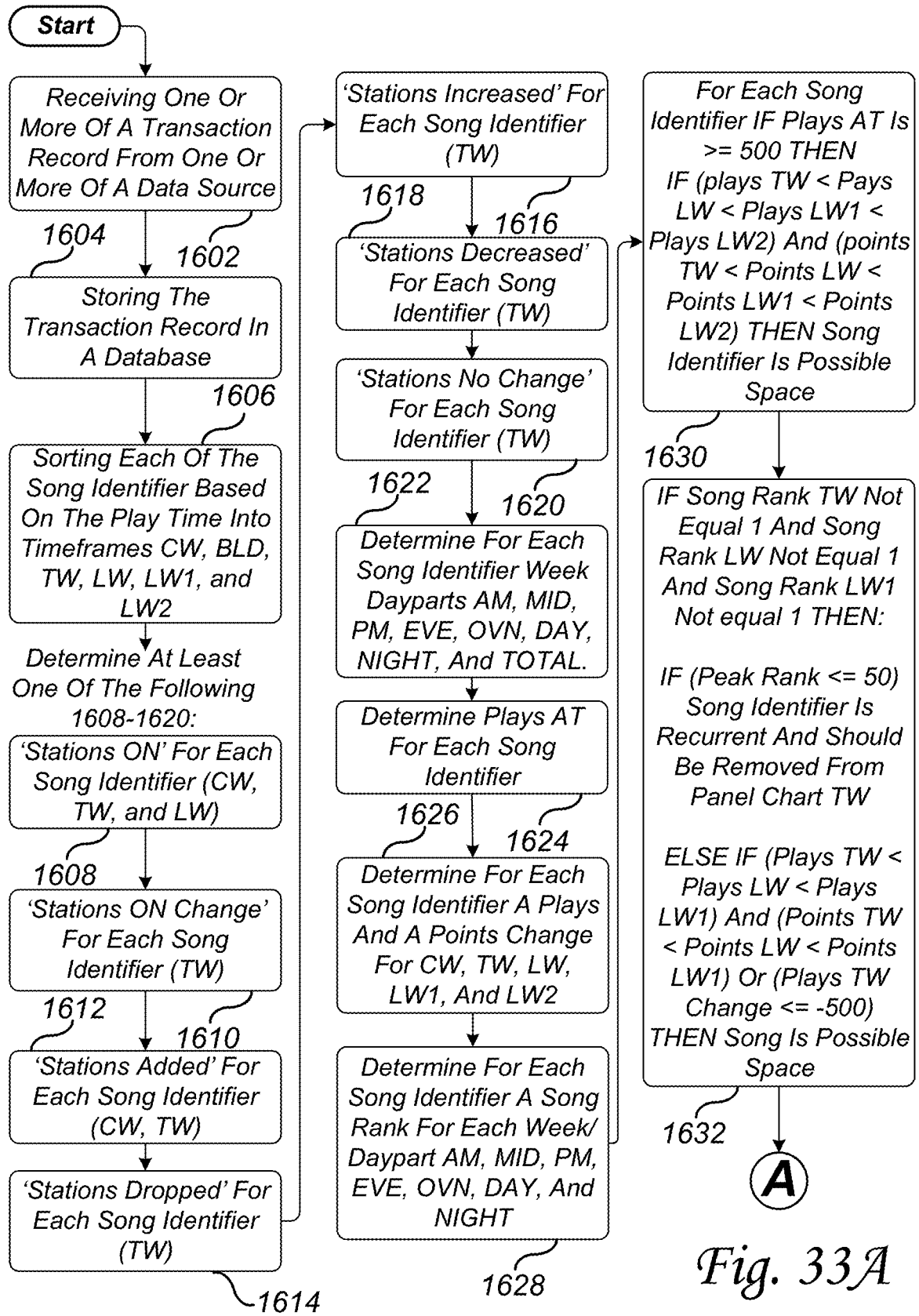

Referring to FIG. 33A-B, there is illustrated one example of a method of evaluating the play performance of broadcast music. In an exemplary embodiment, the data processing resource 302 also referred to as server 302 receives transaction records from data sources 402. Such transaction records 602 comprise song identifiers that are unique and identify a song down to the version of the song such as studio, live, audio, video, and other variations. Additionally, transaction record 602 comprises associated with each song identifier, the song play location, and the song play time. Such song play locations can be radio station identification, digital media systems, or other locations. The song play time can include the time which can then be used to sort the song identifiers into dayparts and other categories.

In operation, the data sources 402 aggregate transaction record data from playlists and other sources. Such playlists and other sources can include radio stations 214A, digital systems 214B including podcasts, social media, and other, and other sources 214C. Certain playlists from certain radio stations and other sources can be considered representative of consumer listening trends and preferences. These playlists and associated playlists can be operated on or otherwise analyzed to develop action trends and insights. Such trends and insights are presented to an artist 702, manager 704, or authorized person 706 referred to as user 702/704/706 as airplay recommendations. Such airplay recommendations can include the identification of POSSIBLE SPACE that may exist where the user can seek to increase the number of the song plays for desired one or more of the song identifiers thus improving song rank for desired one or more of the song identifiers. POSSIBLE SPACE on a chart are songs also referred to as song identifiers that have recently or soon will be removed from the chart thus creating space for a different song identifier to be played or played more.

In an exemplary embodiment, the transaction records are analyzed by server 302, and a plurality of statistics, rankings, sorting, and other determinations are made. The user 702/704/706 can then select dashboards to produce meaningful insights and recommendations through evaluating song play performance of broadcast music that the user 702/704/706 can use to increase song identifier play and ranking and use in other ways. The method begins in step 1602.

In step 1602, one or more of a transaction record is received, at one or more of server 302, from one or more data sources, the transaction record comprising a song identifier, a song play location, and a song play time. The method then moves to step 1604.

In step 1604, at server 302, the transaction record 602 can be stored in database 304, server 302 has data communication access to database 304. The method then moves to step 1606.

In step 1606, at the server, each of the song identifiers is sorted based on the song play time into timeframes that comprise current week (CW), CW comparison, mean building (BLD), this week (TW), last week (LW), the week before LW (LW1), and the week before LW1 (LW2). The method then moves to steps 1608-1620 where at least one of the following is determined:

In step 1608, STATIONS ON for each of the song identifiers within the timeframes of CW, TW, and LW.

In step 1610, STATIONS ON CHANGE for each of the song identifiers within the timeframe of TW.

In step 1612, STATIONS ADDED for each of the song identifiers within the timeframes of CW and TW.

In step 1614, STATIONS DROPPED for each of the song identifiers within the timeframe of TW.

In step 1616, STATIONS INCREASED for each of the song identifiers within the timeframes of CW and TW.

In step 1618, STATIONS DECREASED for each of the song identifiers within the timeframes of CW and TW.

In step 1620, STATIONS NO CHANGE for each of the song identifiers within the timeframes of CW and TW. The method then moves to step 1622.

In step 1622, for each song identifier based on the song play time week a dayparts is determined for morning daypart (AM), midday daypart (MID), afternoon daypart (PM), evening day part (EVE), overnight daypart (OVN), daytime daypart (DAY), nighttime daypart (NIGHT), all-hours daypart (TOTAL). The method then moves to step 1624.

In step 1624, for each song identifier an all-time (AT) historical number of plays is determined. The method then moves to step 1626.

In step 1626, for each song identifier, a SONG PLAYS and a POINTS CHANGE is determined for timeframes of CW, TW, LW, LW1, and LW2. The method then moves to step 1628.

In step 1628, for each song identifier, a SONG RANK is determined for dayparts of AM, MID, PM, EVE, OVN, DAY, NIGHT, and TOTAL. The method then moves to step 1630.

Determining in either step 1630 or step 1632 if the song identifier is a POSSIBLE SPACE. In this regard, in step 1630 if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the POSSIBLE SPACE, wherein the POSSIBLE SPACE are songs recently or soon to be removed from the chart. Or in step 1632 if the song rank for the TW< >1 and the song rank for the LW< >1 and the song rank from the LW1< >1 then if (a peak rank<=50) then the song identifier is a recurrent and should be removed from the panel chart for the TW else if (the song plays for the TW<the song plays for the LW<the song plays for the LW1) and (the points for the TW<the points for the LW<the points for the LW1) or (the song plays for the TW change<=-500) then the song identifier is the POSSIBLE SPACE. The method then moves to step 1634.

In step 1634, a user 702/704/706 using one or more of a computing device 500 selects a dashboard to view. The computing device 500 data communicates by way of a global network 200 with server 302. The method then moves to step 1636.

In step 1636, the plurality of dashboard data related to the dashboard is received, at computing device 500, from server 302. The method then moves to step 1638.

In step 1638, the dashboard is generated on the display 510 of the computing device 500 comprising indicia or graphics based in part on the plurality of dashboard data. The dashboard comprises one or more airplay recommendations for one or more of the song identifiers. In operation, the airplay recommendations include informing the user 702/704/706 of one or more of the song play locations where a POSSIBLE SPACE exists where the user 702/704/706 can seek to increase the number of the song plays for desired one or more of the song identifier thus improving the song rank for desired one or more of the song identifier.

In an exemplary embodiment and with reference to FIG. 34, a song ranked higher (High) calculation method begins in step 1202 by getting all primary panel CURRENTS that are ranked higher nationally than the song in question TW;

In step 1204, remove any songs in POSSIBLE SPACE.

In step 1206, from that list get all songs not playing on the station TW.

In step 1208, also get all songs where Station Plays=0 TW OR (TW<ON THRESHOLD and Station Plays BLD<ON THRESHOLD and Station Plays AT<=20). The method is then exited.

In an exemplary embodiment and with reference to FIG. 35, a song ranked lower (Low) calculation method begins in step 1302 by getting all primary panel CURRENTS that are ranked lower nationally than the song in question TW.

In step 1304, remove any songs in POSSIBLE SPACE.

In step 1306, from that list get all songs where Station Plays TW, CW, or BLD>=ON THRESHOLD. The method is then exited.

In an exemplary embodiment and with reference to FIG. 36, a song station status calculation method begins in step 1402 where the song STATIONS status is set to 'ON':
  IF Plays TW>=ON THRESHOLD OR Plays CW>=ON THRESHOLD
  OR Plays BLD>=ON THRESHOLD;
  or
  Plays TW>0 AND Plays AT>=20.

In step 1404, the song STATIONS status is set to 'OFF' if the conditions in step 1402 are not met. The method is then exited.

In an exemplary embodiment, a STATIONS DROPPED calculation method is when a station was 'ON' a song LW but is now 'OFF' TW.

In an exemplary embodiment, a STATIONS ADDED calculation method is:
  TW: A station was 'OFF' a song LW but is now 'ON' TW; and
  CW: A station was 'OFF' a song TW but is now 'ON' CW.

In an exemplary embodiment, the STATION PLAYLIST calculation method is all songs that played on a station one or more times TW that are also CURRENTS on the primary panel or were CURRENTS on the primary panel within the last four weeks.

Additional features and advantages of the present invention include:

- Panel Filters (Filter by ownership, state, city, and other filters);
- Choose Primary Panel for sub-user created panels;
- Panel and Station Playlist (Searchable list that shows actual play dates for a song on panel or station);
- Station Status After Added (Not just for setting up the chart, but a song/station status can be set even after it has been added to a station);
- Administrator User Roles and Permissions including Super Admin, Everything, Admins, Group Permissions, Individual Permissions, and other user role settings;
- Account User Roles including Account Owner—Label/Company (Can Only Be One Owner), Billing, Settings, Manage All teams, Manage All Users and Admins, Account Manager, Manage All Team Settings, Manage All Standard Users, Team Manager (Can be a manager for multiple teams), Manage Team Settings, Manage Team Users, Team User (Can be a user of multiple teams), Manage Own Account, and other account user roles;
- Account Settings Hierarchy Levels including Default (Specified by Super Admins), Account (Specified by Account Owner or Account Manager), Team (Specified by Account Owner, Account Manager, Team Manager), User, and other account settings hierarchy levels;
- On Threshold can be set at the team and/or account level;
- Station Contacts including Admin Defined Default Contacts (Cannot be deleted by a user or manager), Assigned to one or more stations, can have different metadata for each station (Ex phone numbers for station one, for station two), User-defined metadata with configurable visibility levels, User (visible to the user only), Team (visible to specific teams), Account (visible to the entire team), and other station contacts;
- Custom User/Team/Account Contacts including User-defined metadata, Contact visibility configurable, User, Team, Account, and other contacts.
- Competition Page including 5/10 songs behind/ahead, Table View, Chart View, and Selectable Metrics;
- Song Notes can be linked to a station, have a visibility level, User, Team, and If not linked to a station they are considered "Talking Points";
- Station/Song Notes have visibility, User, Team, Account, can have a date, can have a notification on a specific date, and can have a type (Phone Call, Talking Point, Dinner, Radio Show);
- Song Watchlist Types include Team and User;
- Songs on Watchlist can have associated competition songs;
- Unreleased Songs Users can add songs before they have been released (No station plays), and once plays are detected they can merge their data for the song (station notes, outlook, talking points) with the play data;
- Notifications and Alerts users set a condition like when a song plays TW is >=500, and users are then notified via the methods of their choice, in a software application (app), text, email, other;
- Tables, users should be able to hide/show table fields with some enabled by default, users can drag and drop columns to rearrange them, users should be able to Export Data (CSV, PDF, Docx), Users can filter rows by column data (click in the header to filter on column), and Filters not only filter the data but recalculate appropriate fields;
- Modules have options to expand to full screen;
- Outlook Statuses are customizable at the account/team level and able to add notes when assigning a status to a station;
- Desktop Apps include Authentication, Cookies, CSV Downloads, Import into Database, and Weekly refresh;
- Other Notes include seeing Decreases and Increases Separated from Total Change TW, CW;
- Other Fields include Station First Play Date, Station First on Date, Panel First Play Date, Panel Release Date; and
- Radio Play Data (Each Row) include Song Name, Artist Name, Date/Time of Play, Station Played On, and Additional Metadata Varies Per Data Source.

Below follows a list of exemplary embodiments, for example, and not a limitation, of the present invention.

In an exemplary embodiment, a STRENGTH RATING can be determined by using digital streaming services, social media, radio data, event ticket sales, and other available data to create an overall strength ratio between all songs and artists on the chart. This ratio could then be used to rank and compare songs and artists' overall strength in a particular market or countrywide. Coupled with machine learning this could help forecast the future popularity of a song or artist, and local/national radio chart position.

In an exemplary embodiment, a SONG RATING can be determined by creating an algorithm using digital streaming services, social media, radio data, event ticket sales, and other available data in a market that calculates a "Spintelligence Ranking" for a specific song in a market. This relative ranking could be used to show label promotional teams & radio stations which songs they should be playing.

In an exemplary embodiment, a LIVE MUSIC MONITORING system and method can be created using a small hardware device that integrates into an establishment's sound system that then uses automatic content recognition to determine what songs are being played and when. This device could use line input and/or a microphone. The data could then be used for direct licensing, and royalty sorting, as well as integrated into the overall artist strength calculation previously listed.

In an exemplary embodiment, an AUTOMATIC CONTENT RECOGNITION system and method can be created using a small hardware device/node that includes support for software-defined radio (SDR). This device could monitor multiple radio stations in a market, converting the signals into audio streams that then use Automatic Content Recognition either on the device or transferred to another server to extract the time of play, location, and other metadata for songs being played. This device could also recognize commercials, emergency broadcasts, and other audio types being played on the station. It could be used in the strength calculation above as well as royalty and direct licensing. A variant of this could be used to track emergency response, police, airport, and other radio bands for various uses.

In an exemplary embodiment, a plurality of TALKING POINTS can be created by using digital streaming services, social media, radio data, event ticket sales, and other available data to automatically create "Talking Points" that promotional teams can use when speaking to radio stations to prove why their song should be getting more plays.

In an exemplary embodiment, an AVERAGE STATION ADD RANK can be determined using historical data to create groups of songs (that are not CURRENTS on the national panel). They are grouped by format, tempo, beats per minute, artist gender, artist popularity 1-4 (Determined by factors such as recent #1 hits, touring event attendance, Spotify playlists, Twitter Mentions, etc.), and other factors related to the song or artist's characteristics.

In an exemplary embodiment, a software plugin can be created to plugin into radio station applications to drive digital marketing campaigns using music statistics.

In an exemplary embodiment, listeners can be allowed to vote in digital/email/online surveys or other types and/or kinds of surveys.

In an exemplary embodiment, favorite artist data and insights can be shared weekly through digital communication methods and technologies.

In an exemplary embodiment, users can be prompted to proactively contact radio stations through software applications to generate more airplay to change the weekly number of play outcomes.

In an exemplary embodiment, loyalty programs can be implemented through software applications.

In an exemplary embodiment, listeners can be allowed to follow the real-time stats of their favorite artists.

In an exemplary embodiment, radio play stats and surveys can be published directly to radio station social media accounts to generate likes, clicks, and others.

In an exemplary embodiment, a chatbot can be implemented that can answer stats listener and industry queries as to chart and play information.

In an exemplary embodiment, data from MPEG7/Other sources can be combined to create a unique dataset and reports that differentiate the company.

In an exemplary embodiment, data collection capabilities can be integrated into in-vehicle systems.

In an exemplary embodiment, a software plugin feature for a software application can be created that listens to what is being played on the smartphone and then uses acoustical fingerprint techniques to get data related to the audio. The resultant can then be stored in a database and/or used in other ways.

In an exemplary embodiment, data on a personal playlist accessible on the smartphone can be captured through the software application.

In an exemplary embodiment, the present invention can track podcast plays and downloads.

In an exemplary embodiment, quick real-time data facts can be delivered by way of text messages to industry leaders and others.

Referring to FIG. 37, there are illustrated exemplary embodiments of a global network based system for evaluating song play performance of broadcast music that can be used interchangeably with the methods of the present invention.

In step 1702, the transaction record 602 correlates with a song associated with the song identifier being broadcast from a radio station which is referred to as the song play location at the song play time.

In step 1704, a POINTS is determined for each of the song identifiers played at each of the song play locations, the points are equal to the song plays multiplied by a weighting factor for the song play location.

In step 1706, the method then determines a station playlist for each of the song play locations including each of the song identifiers with two or more of the play for the TW that are also CURRENTS on a primary panel or were one of the CURRENTS on the primary panel within last four weeks. In this regard, the CURRENTS are the song identifier playing on the song play location weekly ten or more times, and the primary panel is the main group of radio stations that a national ranking chart is based on.

In step 1708, each of the song identifiers is sorted for the TW into filter categories for a rotation as follows:
- a HEAVY category for the song plays greater than 40 during the CW or TW;
- a MEDIUM category for the song plays greater than 25 during the CW or TW;
- a LIGHT category for the song plays greater than 10 during the CW or TW;
- a DAYPARTS category for the song plays greater than an on threshold during the CW or TW;
- a TESTING category for the song plays greater than zero and less than the on threshold during the CW or TW; or
- a NONE category for the song plays equals zero during the CW and TW.

In step 1710, the method determines if the song identifier is a POSSIBLE SPACE as follows: if the song rank for the TW< >1 and the song rank for the LW< >1 and the song rank from the LW1< >1 then if (a peak rank<=50) then the song identifier is a recurrent and should be removed from the panel chart for the TW else if (the song plays for the TW<the song plays for the LW<the song plays for the LW1) and (the points for the TW<the points for the LW<the points for the LW1) or (the song plays for the TW change<=−500) then the song identifier is the POSSIBLE SPACE, wherein the POSSIBLE SPACE are songs recently or soon to be removed from the chart.

In step 1712, the method determines if the song identifier is a POSSIBLE SPACE as follows: if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the POSSIBLE SPACE, wherein the POSSIBLE SPACE are songs recently or soon to be removed from the chart.

In step 1714, one or more airplay recommendation is generated for one or more song identifier based in part on the plurality of dashboard data. In operation, the airplay recommendation includes informing the user of one or more of the song play locations where a POSSIBLE SPACE exists, where the user can seek to increase the number of the song plays for desired one or more song identifiers thus improving song rank for desired one or more song identifiers.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements.

What is claimed is:

1. A system for evaluating song play performance of broadcast music, the system comprising:
   one or more of a server comprising a microprocessor, a database, and a memory, the database and the memory are operationally related to the microprocessor, the memory is encoded with instructions that when executed by the microprocessor perform the steps of:
      receiving one or more of a transaction record from one or more of a data source, the transaction record comprising a song identifier, a song play location, and a song play time; and
      storing the transaction record in the database;
      sorting each of the song identifier based on the song play time into timeframes that comprise a current week (CW), a CW comparison, a mean building (BLD), a this week (TW), a last week (LW), a week before LW (LW1), and a week before LW1 (LW2);
      determining each of the following:
         a stations on for each of the song identifier within timeframes of the CW, the TW, and the LW;
         a stations on change for each of the song identifier within timeframe of the CW and TW;
         a stations added for each of the song identifier within timeframes of the CW and the TW;
         a stations dropped for each of the song identifier within timeframe of the TW;
         a stations increased for each of the song identifier within timeframe of the CW and TW;
         a stations decreased for each of the song identifier within timeframe of the CW and TW; and
         a stations no change for each of the song identifier within timeframe of the CW and TW;
      determining for each song identifier, based on the song play time, week dayparts which comprise a morning daypart (AM), a midday daypart (MID), an afternoon daypart (PM), an evening day part (EVE), an overnight daypart (OVN), a daytime daypart (DAY), a nighttime daypart (NIGHT), and an all-hours daypart (TOTAL);
      determining a first play date for each of the song identifier that previously lacked the first play date determination;
      determining for each song identifier an all-time (AT) historical number of plays;
      determining for each song identifier a song plays and a points change for timeframes of the CW, the TW, the LW, the LW1, and the LW2; and
      determining for each song identifier a song rank for dayparts of the AM, the MID, the PM, the EVE, the OVN, the DAY, the NIGHT, and the TOTAL;
   more than one computing device comprising a device microprocessor, a display, and a device memory, the display and the device memory are operationally related to the device microprocessor, the computing device data communicates by way of a global network with the server, the device memory is encoded with instructions that when executed by the device microprocessor perform the steps of:
      selecting, by a user, a dashboard to view;
      causing, based in part on the dashboard selected, the server to access or operate on, to create a plurality of dashboard data related to the dashboard, at least some of the following: one or more of the transaction records, the CW, the CW comparison, the BLD, the TW, the LW, the LW1, the LW2, the stations on, the stations on change, the stations added, the stations dropped, the stations increased, the stations decreased, the stations no change, the first play date, the AM, the MID, the PM, the EVE, the OVN), the DAY), the NIGHT, the TOTAL, or the AT;
      receiving, at the computing device, from the server the plurality of dashboard data related to the dashboard; and
      generating the dashboard on the display of the computing device comprising indicia or graphics based in part on the plurality of dashboard data;
   wherein the user can evaluate play performance of one or more of the song identifier, the song play location, and the song play time.

2. The system in accordance with claim 1, the transaction record correlates with a song that is associated with the song identifier being broadcast from a radio station which is referred to as the song play location at the song play time.

3. The system in accordance with claim 1, further comprising the step of:
   determining a points for each of the song identifier played at each of the song play location, the points are equal to the song plays multiplied by a weighting factor for the song play location.

4. The system in accordance with claim 3, further comprising the step of:
   determining if the song identifier is a possible space as follows:
      if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the possible space;
   wherein the possible space are songs recently or soon to be removed from chart.

5. The system in accordance with claim 3, further comprising the step of:
   determining if the song identifier is a possible space as follows:
   if the SONG RANK for the TW< >1 and the SONG RANK for the LW< >1 and the SONG RANK from the LW1< >1 then if (a peak rank<=50) then the song identifier is a recurrent and should be removed from the panel chart for the TW else if (the song plays for the TW<the song plays for the LW<the song plays for the LW1) and (the points for the TW<the points for the LW<the points for the LW1) or (the song plays for the TW change<=-500) then the song identifier is the possible space;
   wherein the possible space are songs recently or soon to be removed from chart.

6. The system in accordance with claim 1, further comprising the step of:
   generating one or more of an airplay recommendation for one or more of the song identifier based in part on the plurality of dashboard data, wherein the airplay recommendation includes informing the user of one or more of the song play location where a possible space exists where the user can seek to increase number of the song plays for desired one or more of the song identifier thus improving song rank for desired one or more of the song identifier.

7. The system in accordance with claim 1, further comprising the step of:
   setting the status on for each of the song identifier when:
   the song plays during the TW>=to an on threshold, the song plays during the CW>=the on threshold, or the song plays during the BL>=the on threshold, wherein the on threshold for the song identifier is radio station number of song plays that move the song identifier from a status not on to the status on; or
   the song plays for the TW>zero and the song plays for the AT>=20.

8. The system in accordance with claim 1, further comprising the step of:
   determining a station playlist for each of the song play location as including each of the song identifiers with two or more of the play for the TW that are also a currents on a primary panel or were one of the currents on the primary panel within last four weeks;
   wherein the currents are the song identifier playing on the song play location weekly ten or more times;
   wherein the primary panel is main group of radio stations that a national ranking chart is based on.

9. The system in accordance with claim 1, further comprising the step of:
   sorting each of the song identifiers for the TW into filter categories for a rotation as follows:
   a heavy category for the song plays greater than 40 during the CW or TW;
   a medium category for the song plays greater than 25 during the CW or TW;
   a light category for the song plays greater than 10 during the CW or TW;
   a dayparts category for the song plays greater than an on threshold during the CW or TW;
   a testing category for the song plays greater than zero and less than the on threshold during the CW or TW; or
   a none category for the song plays equals zero during the CW and TW.

10. A method of evaluating song play performance of broadcast music, the method comprising the steps of:
    receiving, at one or more of a server, one or more of a transaction record from one or more of a data source, the transaction record comprising a song identifier, a song play location, and a song play time; and
    storing, at the server, the transaction record in a database, the server having data communication access to the database;
    sorting, at the server, each of the song identifier based on the song play time into timeframes that comprise a current week (CW), a CW comparison, a mean building (BLD), a this week (TW), a last week (LW), a week before LW (LW1), and a week before LW1 (LW2);
    determining each of the following:
      a stations on for each of the song identifier within timeframes of the CW, the TW, and the LW;
      a stations on change for each of the song identifier within timeframe of the CW and TW;
      a stations added for each of the song identifier within timeframes of the CW and the TW;
      a stations dropped for each of the song identifier within timeframe of the TW;
      a stations increased for each of the song identifier within timeframe of the CW and TW;
      a stations decreased for each of the song identifier within timeframe of the CW and TW; and
      a stations no change for each of the song identifier within timeframe of the CW and TW;
    determining for each song identifier, based on the song play time, week dayparts which comprise a morning daypart (AM), a midday daypart (MID), an afternoon daypart (PM), an evening day part (EVE), an overnight daypart (OVN), a daytime daypart (DAY), a nighttime daypart (NIGHT), and an all-hours daypart (TOTAL);
    determining a first play date for each of the song identifier that previously lacked the first play date determination;
    determining for each song identifier an all-time (AT) historical number of plays;
    determining for each song identifier a song plays and a points change for timeframes of the CW, the TW, the LW, the LW1, and the LW2; and
    determining for each song identifier a song rank for dayparts of the AM, the MID, the PM, the EVE, the OVN, the DAY, the NIGHT, and the TOTAL;
    selecting, by a user using one or more of a computing device, a dashboard to view, the computing device data communicates by way of a global network with the server;
    causing, based in part on the dashboard selected, the server to access or operate on, to create a plurality of dashboard data related to the dashboard, at least some of the following: one or more of the transaction records, the CW, the CW comparison, the BLD, the TW, the LW, the LW1, the LW2, the stations on, the stations on change, the stations added, the stations dropped, the stations increased, the stations decreased, the stations no change, the first play date, the AM, the MID, the PM, the EVE, the OVN, the DAY, the NIGHT, the TOTAL, or the AT;
    receiving, at the computing device, from the server the plurality of dashboard data related to the dashboard; and
    generating the dashboard on the display of the computing device comprising indicia or graphics based in part on the plurality of dashboard data;

wherein the user can evaluate play performance of one or more of the song identifier, the song play location, and the song play time.

11. The method in accordance with claim 10, the transaction record correlates with the song identifier being broadcast from a radio station which is referred to as the song play location at the song play time.

12. The method in accordance with claim 10, further comprising the step of:
determining a points for each of the song identifier played on each of the song play location, the points are equal to the song plays multiplied by a weighting factor for the song play location.

13. The method in accordance with claim 12, further comprising the step of:
determining if the song identifier is a possible space as follows:
if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the possible space, wherein the possible space are songs recently or soon to be removed from chart.

14. The method in accordance with claim 12, further comprising the step of:
determining if the song identifier is a possible space as follows:
if a song rank for the TW< >1 and the song rank for the LW< >1 and the song rank from the LW1< >1 then if (a peak rank<=50) then the song identifier is a recurrent and should be removed from the panel chart for the TW else if (the song plays for the TW<the song plays for the L<the song plays for the LW1) and (the points for the TW<the points for the LW<the points for the LW1) or (the song plays for the TW change<=−500) then the song identifier is the possible space, wherein the possible space are songs recently or soon to be removed from chart.

15. The method in accordance with claim 10, further comprising the step of:
generating one or more of an airplay recommendation for one or more of the song identifier based in part on the plurality of dashboard data, wherein the airplay recommendation includes informing the user of one or more of the song play location where a possible space exists where the user can seek to increase number of the song plays for desired one or more of the song identifier thus improving a song rank for desired one or more of the song identifier, wherein the possible space are songs recently or soon to be removed from chart.

16. The method in accordance with claim 10, further comprising the step of:
setting the status on for each of the song identifier when:
the song plays during the TW>=to an on threshold, the song plays during the CW>=the on threshold, or the song plays during the BLD>=the on threshold, wherein the on threshold for the song identifier is radio station number of song plays that move the song identifier from a status not on to the status on; or
the song plays for the TW>zero and the song plays for the AT>=20.

17. The method in accordance with claim 10, further comprising the step of:
determining a station playlist for each of the song play location as including each of the song identifiers with two or more of the play for the TW that are also a currents on a primary panel or were one of the currents on the primary panel within last four weeks;
wherein the currents are the song identifier playing on the song play location weekly ten or more times;
wherein the primary panel is main group of radio stations that a national ranking chart is based on.

18. The method in accordance with claim 10, further comprising the step of:
sorting each of the song identifiers for the TW into filter categories for a rotation as follows:
a heavy category for the song plays greater than 40 during the CW or TW;
a medium category for the song plays greater than 25 during the CW or TW;
a light category for the song plays greater than 10 during the CW or TW;
a dayparts category for the song plays greater than an on threshold during the CW or TW;
a testing category for the song plays greater than zero and less than the on threshold during the CW or TW; or
none category for the song plays equals zero during the CW and TW.

19. A method of evaluating song play performance of broadcast music, the method comprising the steps of:
receiving, at one or more of a server, one or more of a transaction record from one or more of a data source, the transaction record comprising a song identifier, a song play location, and a song play time; and
storing, at the server, the transaction record in the database;
sorting, at the server, each of the song identifier based on the song play time into timeframes that comprise a current week (CW), a CW comparison, a mean building (BLD), a this week (TW), a last week (LW), a week before LW (LW1), and a week before LW1 (LW2);
determining at least one of the following:
a stations on for each of the song identifier within timeframes of the CW, the TW, and the LW;
a stations on change for each of the song identifier within timeframe of the CW and TW;
a stations added for each of the song identifier within timeframes of the CW and the TW;
a stations dropped for each of the song identifier within timeframe of the TW;
a stations increased for each of the song identifier within timeframe of the CW and TW;
a stations decreased for each of the song identifier within timeframe of the CW and TW; or
a stations no change for each of the song identifier within timeframe of the CW and TW;
determining for each song identifier, based on the song play time, week dayparts which comprise a morning daypart (AM), a midday daypart (MID), an afternoon daypart (PM), an evening day part (EVE), an overnight daypart (OVN), a daytime daypart (DAY), a nighttime daypart (NIGHT), and an all-hours daypart (TOTAL);
determining for each song identifier an all-time (AT) historical number of plays;
determining for each song identifier a song plays and a points change for timeframes of the CW, the TW, the LW, the LW1, and the LW2, the points are equal to the song plays multiplied by a weighting factor for the song play location;

determining for each song identifier a song rank for dayparts of the AM, the MID, the PM, the EVE, the OVN, the DAY, the NIGHT, and the TOTAL;

determining if the song identifier is a possible space by one of the following steps:
  if the song plays for the AT is >=500 then if (the song plays for the TW<the song plays for the LW<the song plays for the LW1<the song plays for the LW2) and (the points for the TW<the points for the LW<the points for the LW1<the points for the LW2) then the song identifier is the possible space, wherein the possible space are songs recently or soon to be removed from chart; or
  if the song rank for the TW< >1 and the song rank for the LW< >1 and the song rank from the LW1< >1 then if (a peak rank<=50) then the song identifier is a recurrent and should be removed from the panel chart for the TW else if (the song plays for the TW<the song plays for the LW<the song plays for the LW1) and (the points for the TW<the points for the LW<the points for the LW1) or (the song plays for the TW change<=-500) then the song identifier is the possible space;

selecting, by a user using one or more of a computing device, a dashboard to view, the computing device data communicates by way of a global network with the server;

receiving, at the computing device, from the server a plurality of dashboard data related to the dashboard; and generating the dashboard on the display of the computing device comprising indicia or graphics based in part on the plurality of dashboard data, the dashboard comprising one or more of an airplay recommendation for one or more of the song identifier, wherein the airplay recommendation includes informing the user of one or more of the song play location where a possible space exists where the user can seek to increase number of the song plays for desired one or more of the song identifier thus improving the song rank for desired one or more of the song identifier.

20. The method in accordance with claim 19, further comprising at least of the following steps:
  setting the status on for each of the song identifier when:
    the song plays during the TW>=to an on threshold, the song plays during the CW>=the on threshold, or the song plays during the BLD>=the on threshold, wherein the on threshold for the song identifier is radio station number of song plays that move the song identifier from a status not on to the status on; or
    the song plays for the TW>zero and the song plays for the AT>=20;
  determining a station playlist for each of the song play location as including each of the song identifiers with two or more of the play for the TW that are also a currents on a primary panel or were one of the currents on the primary panel within last four weeks;
  wherein the currents are the song identifier playing on the song play location weekly ten or more times;
  wherein the primary panel is main group of radio stations that a national ranking chart is based on; or
  sorting each of the song identifiers for the TW into filter categories for a rotation as follows:
    a heavy category for the song plays greater than 40 during the CW or TW;
    a medium category for the song plays greater than 25 during the CW or TW;
    a light category for the song plays greater than 10 during the CW or TW;
    a dayparts category for the song plays greater than an on threshold during the CW or TW;
    a testing category for the song plays greater than zero and less than the on threshold during the CW or TW; or
    a none category for the song plays equal zero during the CW and TW.

\* \* \* \* \*